(12) United States Patent
Line et al.

(10) Patent No.: US 11,279,262 B2
(45) Date of Patent: *Mar. 22, 2022

(54) ADJUSTABLE SEAT ASSEMBLY

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Joseph Michael Kish, Canton, MI (US); Macit Aktas, Windsor (CA); Spencer Robert Hoernke, Dundas (CA); David Frederick Lyons, New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

This patent is subject to a terminal disclaimer.

(21) Appl. No.: 16/452,671

(22) Filed: Jun. 26, 2019

(65) Prior Publication Data

US 2020/0406789 A1    Dec. 31, 2020

(51) Int. Cl.
*B60N 2/14* (2006.01)
*B60N 2/30* (2006.01)
*B60N 2/08* (2006.01)

(52) U.S. Cl.
CPC ........... *B60N 2/143* (2013.01); *B60N 2/0806* (2013.01); *B60N 2/3009* (2013.01); *B60N 2/3045* (2013.01)

(58) Field of Classification Search
CPC .... B60N 2/0292; B60N 2/143; B60N 2/3009; B60N 2/3045; B60N 2/3047; A47C 1/121
See application file for complete search history.

(56) References Cited

U.S. PATENT DOCUMENTS

| | | | | |
|---|---|---|---|---|
| 3,338,622 A | * | 8/1967 | Bachmann | B60N 2/143 296/65.07 |
| 4,973,017 A | * | 11/1990 | Takagi | B60N 3/004 248/292.13 |
| 5,000,505 A | | 3/1991 | Kawashita et al. | |
| 5,156,438 A | * | 10/1992 | Hayakawa | B60N 2/071 297/335 |
| 5,158,338 A | * | 10/1992 | Hayakawa | B60N 2/01591 297/335 |
| 5,320,411 A | | 6/1994 | Sera | |
| 5,393,116 A | * | 2/1995 | Bolsworth | B60N 2/01583 296/65.03 |
| 5,611,589 A | * | 3/1997 | Fujii | B60N 2/01 296/64 |

(Continued)

*Primary Examiner* — David R Dunn
*Assistant Examiner* — Christopher E Veraa
(74) *Attorney, Agent, or Firm* — Vichit Chea; Price Heneveld LLP

(57) ABSTRACT

A seat assembly includes a track assembly having a swivel mechanism slideably supported along the track assembly. A base frame is supported on the swivel mechanism between forward-facing and rearward-facing configurations. A seatback is pivotally coupled to the base frame by a recliner mechanism. A seat portion is pivotally coupled to the base frame and includes a front edge. The seat portion is operable between first and second positions, such that the front edge of the seat portion defines a forward-most portion of the seat assembly when the seat portion is in the first position. Further, the front edge of the seat portion is vertically juxtaposed over the base frame when the seat portion is in the second position.

14 Claims, 19 Drawing Sheets

(56) References Cited

U.S. PATENT DOCUMENTS

| | | | |
|---|---|---|---|
| 5,636,884 A * | 6/1997 | Ladetto | B60N 2/06 296/65.09 |
| 5,720,462 A * | 2/1998 | Brodersen | B60N 2/143 248/425 |
| 5,800,015 A * | 9/1998 | Tsuchiya | B60N 2/0715 248/430 |
| 5,890,764 A * | 4/1999 | Lee | B60N 2/146 297/344.22 |
| 5,951,106 A | 9/1999 | Hirama et al. | |
| 6,142,552 A | 11/2000 | Husted et al. | |
| 6,666,514 B2 | 12/2003 | Muraishi et al. | |
| 7,108,325 B2 | 9/2006 | Williamson et al. | |
| 7,357,451 B2 | 4/2008 | Bendure et al. | |
| 7,559,594 B2 | 7/2009 | McMillen | |
| 7,950,740 B2 | 5/2011 | Bunea et al. | |
| 8,104,834 B2 * | 1/2012 | Moegling | B60N 2/20 297/332 |
| 9,566,886 B2 * | 2/2017 | Lorey | B60N 2/502 |
| 10,065,540 B1 * | 9/2018 | Dry | B60N 2/3056 |
| 10,076,976 B2 * | 9/2018 | Roeglin | B60N 2/14 |
| 2001/0040400 A1 * | 11/2001 | Kamida | B60N 2/305 297/354.13 |
| 2006/0061182 A1 * | 3/2006 | Park | B60N 2/22 297/378.1 |
| 2008/0122279 A1 * | 5/2008 | Park | B60N 2/0875 297/332 |
| 2008/0265644 A1 * | 10/2008 | Delleman | B64D 11/0611 297/356 |
| 2009/0195037 A1 | 8/2009 | Plavetich et al. | |
| 2010/0031866 A1 * | 2/2010 | Thompson | B63B 29/04 114/363 |
| 2013/0212793 A1 * | 8/2013 | Hand | A47K 13/06 4/235 |
| 2018/0162281 A1 * | 6/2018 | Anderson | B60N 2/793 |
| 2019/0359085 A1 * | 11/2019 | Yamauchi | B60N 2/24 |

* cited by examiner

ADJUSTABLE SEAT ASSEMBLY

FIELD OF THE INVENTION

The present invention generally relates to a vehicle seat, and more particularly, to a vehicle seat configured to rotate between forward-facing and rearward-facing configurations within a vehicle interior.

BACKGROUND OF THE INVENTION

A vehicle seat is desired that accommodates rotation within a vehicle interior.

SUMMARY OF THE INVENTION

According to one aspect of the present invention, a seat assembly includes a base frame. A seatback is pivotally coupled to the base frame by a recliner mechanism. A seat portion is pivotally coupled to the base frame and includes a front edge. The seat portion is operable between first and second positions. The front edge of the seat portion defines a forward-most portion of the seat assembly when the seat portion is in the first position. The front edge of the seat portion is vertically juxtaposed over the base frame when the seat portion is in the second position.

According to another aspect of the present invention, a seat assembly includes a base frame including a support surface and first and second support brackets upwardly extending from opposed sides of the support surface. A seat portion is pivotally coupled to the first and second support brackets between use and upright non-use positions. A front edge of the seat portion is vertically juxtaposed over the base frame when the seat portion is in the upright non-use position.

According to yet another aspect of the present invention, a seat assembly includes a track assembly. A swivel mechanism is slideably supported along the track assembly. A base frame is supported on the swivel mechanism between forward-facing and rearward-facing configurations. A seatback is pivotally coupled to the base frame by a recliner mechanism. A seat portion is pivotally coupled to the base frame and includes a front edge. The seat portion is operable between first and second positions. The front edge of the seat portion defines a forward-most portion of the seat assembly when the seat portion is in the first position. The front edge of the seat portion is vertically juxtaposed over the base frame when the seat portion is in the second position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2A:
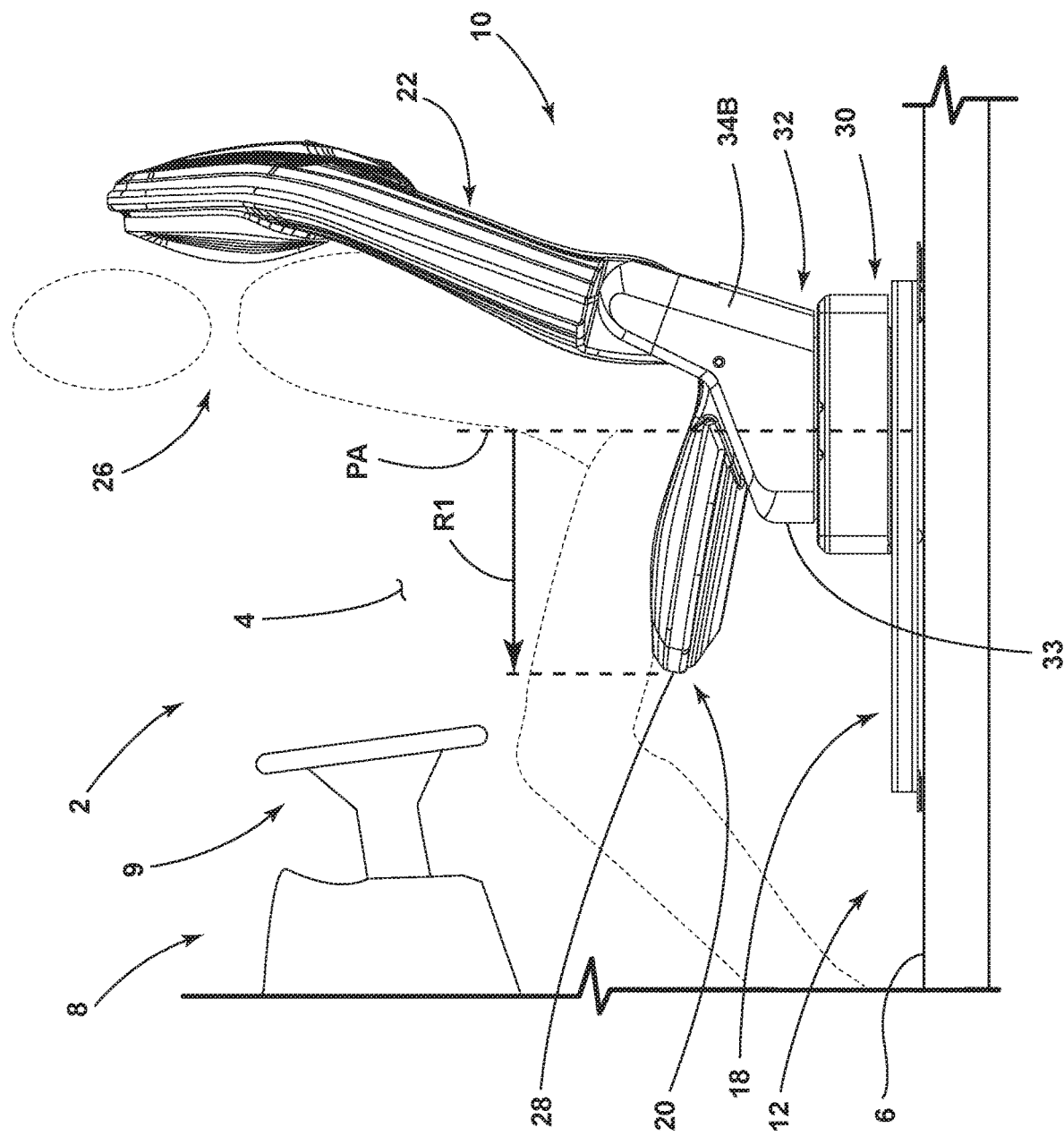
FIG. 2A is a side elevational view of a seat assembly shown in a forward-facing configuration with a seat occupant positioned therein.

For purposes of description herein, the terms "upper," "lower," "right," "left," "rear," "front," "vertical," "horizontal," and derivatives thereof shall relate to the seat assembly as oriented in FIG. 2A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
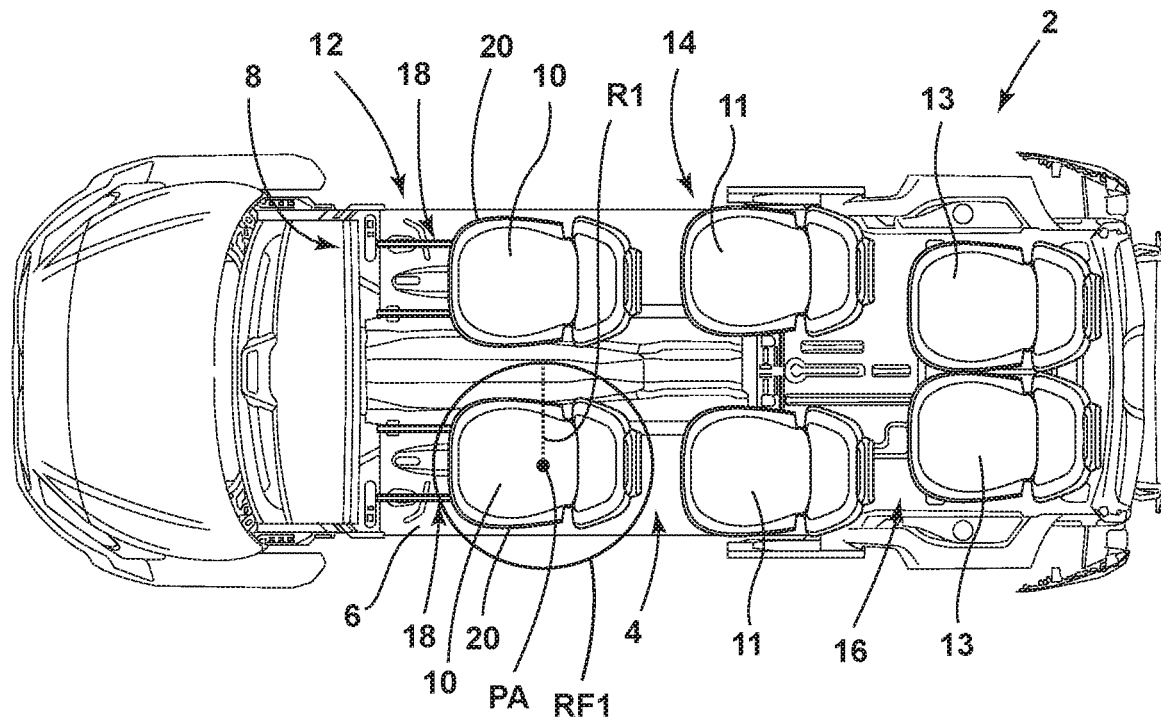
FIG. 1A is a top plan view of a vehicle showing a number of seat assemblies positioned within an interior thereof, wherein a front seat assembly includes a seat portion shown in a deployed position with a rotational footprint indicated.

Referring now to FIG. 1A, a vehicle 2 is shown having a vehicle interior 4. The vehicle interior 4 includes a floorboard 6 and an instrument panel 8. Within the vehicle 2, a plurality of seat assemblies 10, 11 and 13 are shown. The seat assemblies identified with the reference numeral 10 are shown disposed in a front portion 12 of the vehicle interior 4. The seat assemblies identified with reference numeral 11 are shown disposed in an intermediate portion 14 of the vehicle interior 4. The seat assemblies identified with reference numeral 13 are shown disposed in a rear portion 16 of the vehicle interior 4. The seat assemblies 10 shown disposed in the front portion 12 of the vehicle interior 4 are supported on the floorboard 6 by track assemblies 18. The track assemblies 18 are contemplated to provide an extended range of fore and aft movement of the seat assemblies 10 for accommodating forward-facing and rearward-facing configurations. As shown in FIG. 1A, the seat assemblies 10, 11 and 13 of the vehicle 2 are all shown disposed in a forward-facing configuration. For the purposes of this disclosure, the features of the seat assemblies 10, 11 and 13 will be described with reference to seat assemblies 10, however, it is contemplated that the flexibility and pivoting features of the seat assemblies described herein may be featured on other seat assemblies disposed in the intermediate portion 14 or the rear portion 16 of the vehicle interior 4.

With further reference to FIG. 1A, the seat assembly 10 shown on the left side of the front portion 12 of the vehicle 2 has a pivot axis PA indicated thereon. The pivot axis PA defines a first rotational footprint RF1 of the seat assembly 10. Specifically, the first rotational footprint RF1 is defined by a radius R1 which is further defined between the pivot axis PA and a feature of the seat assembly 10 disposed furthest away from the centrally disposed pivot axis PA. As used herein, the term, "rotational footprint" identifies an area in which a seat assembly occupies as it rotates from a forward-facing configuration to a rearward-facing configuration within a vehicle interior. Thus, with the seat assembly 10 shown in the configuration of FIG. 1A, the seat assembly 10 includes a first rotational footprint RF1 based on a centrally disposed pivot axis PA. In the embodiment shown in FIG. 1A, it is contemplated that the left hand seat assembly 10 includes a rotational footprint RF1, provided by its current configuration that is too large for rotation within the interior 4 of the vehicle 2. Particularly, the first rotational footprint RF1 is generally defined in FIG. 1A by the parameters of a deployed seat portion 20. With reference to the seat portion 20, the terms "stowed" and "deployed" "use position" and "upright non-use position," and first and second positions may be used to describe different positions of the seat portion 20. In FIG. 1A, the seat portion 20 is shown in a deployed position, that is a substantially horizontal use position with the overall seat assembly 10 shown in a forward-facing configuration. In FIG. 1A, the seat assembly 10 is configured to support a vehicle occupant in a forward-facing configuration on the deployed seat portion 20.

Figure 1B:
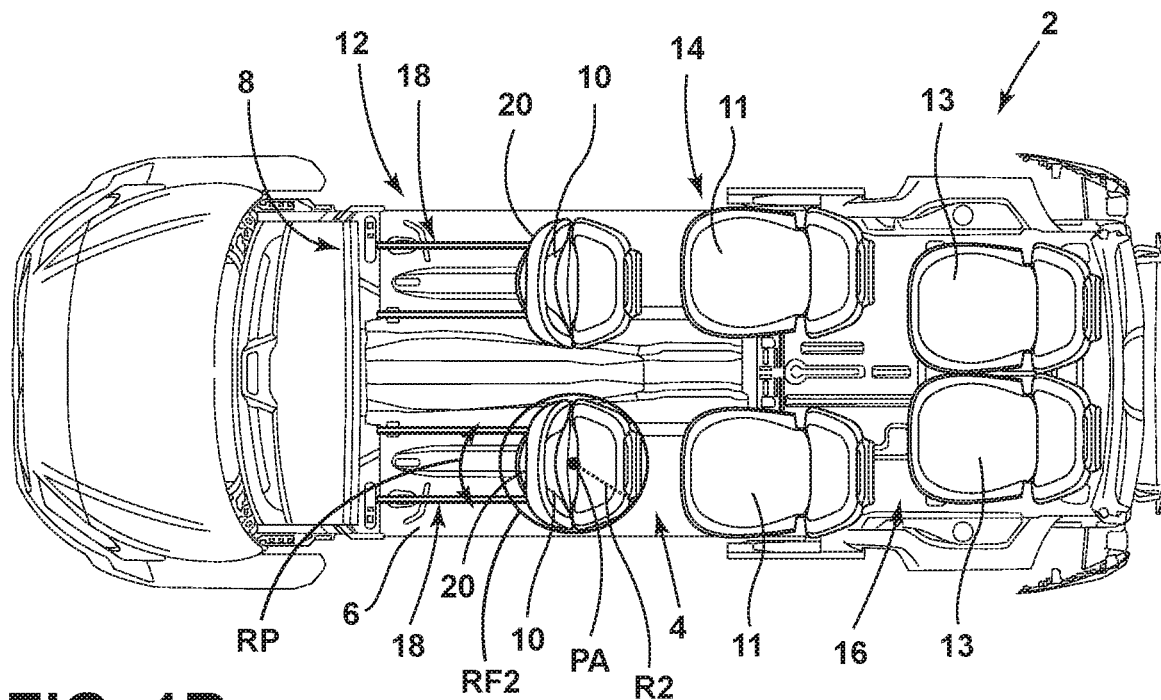
FIG. 1B is a top plan view of the vehicle of FIG. 1A with the front seat assemblies shown with the seat portion in a stowed position and a rotational footprint indicated that is less than the rotational footprint of FIG. 1A.

Referring now to FIG. 1B, the seat assemblies 10 disposed in the front portion 12 of the vehicle 2 are shown with the seat portions 20 thereof in stowed positons. As noted above, the seat assemblies 10 include seat portions 20 that are convertible between deployed and stowed positions. With the seat portion 20 in the stowed position, the overall seat assembly 10 includes a second rotational footprint RF2 which is defined between the centrally disposed pivot axis PA and a radius R2 defined between the centrally disposed pivot axis PA and a feature of the seat assembly 10 disposed furthest therefrom. In comparing FIG. 1A and FIG. 1B, the second rotational footprint RF2 of FIG. 1B is less than the first rotational footprint RF1 of the seat assembly 10 shown in FIG. 1A. In this way, it is contemplated that the seat assembly 10 can rotate within the interior 4 of the vehicle 2 along the pivot axis PA between forward and rearward-facing configurations. Specifically, the movement of the seat portion 20 from the deployed position (FIG. 1A) to the stowed position (FIG. 1B) provides for a second rotational footprint RF2 that can accommodate the pivoting movement of the seat assembly 10 within the vehicle interior 4. Having a second rotational footprint RF2 when the seat portion 20 is in the stowed position provides for a seat assembly 10 that can rotate between forward-facing and rearward-facing configurations within the tight confines of the vehicle interior 4. When the seat portion 20 is in the deployed position, as shown in FIG. 1A, the first rotational footprint RF1 is much greater than the second rotational footprint RF2 shown in FIG. 1B, such that is contemplated that the seat portion 20 would contact a pillar, center console, door panel, or other like feature within the vehicle interior 4, thereby limiting the seat assembly's ability to rotate.

Figure 1C:
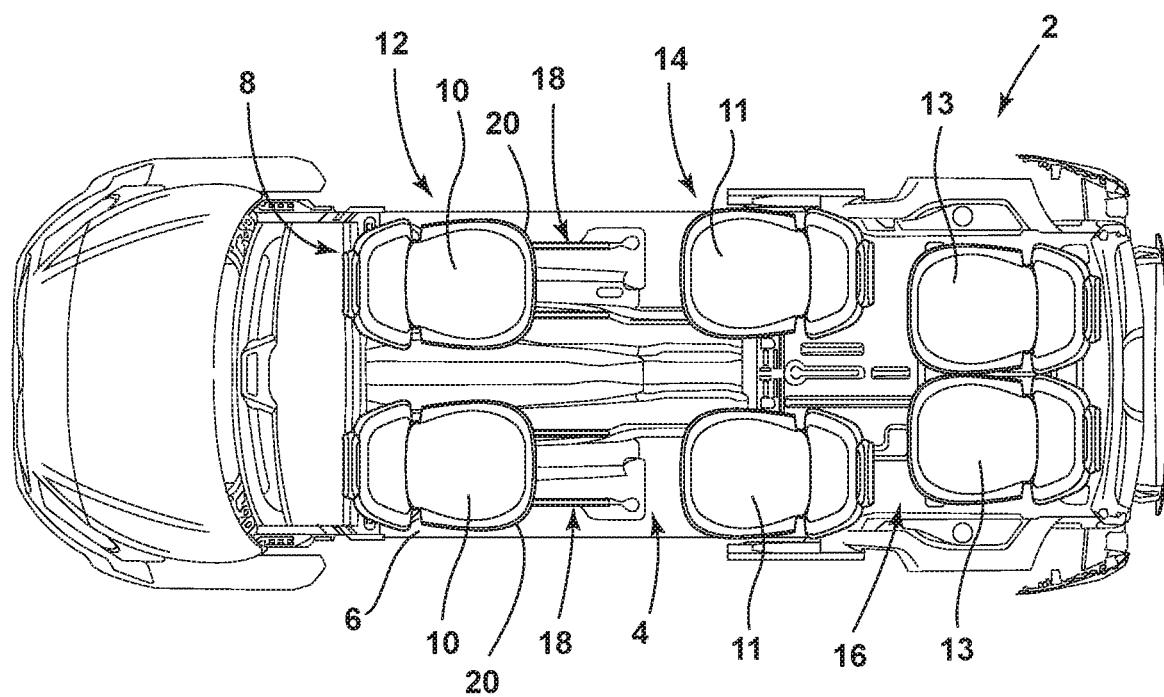
FIG. 1C is a top plan view of the vehicle of FIG. 1B showing the front seat assemblies in rearward-facing configurations.

Referring now to FIG. 1C, the front seat assemblies 10 are shown with the seat portions 20 thereof in the deployed positions with the overall seat assemblies 10 now positioned in a rearward-facing configuration. Thus, from FIG. 1B to FIG. 1C, it is contemplated that the seat assemblies 10 have rotated along the rotational path indicated by arrow RP (FIG. 1B) within the rotational footprint RF2 to provide a rearward-facing configuration for the seat assemblies 10. After rotation, it is contemplated that the seat portions 20 are moved from the stowed position (FIG. 1B) to the rearward-facing deployed position (FIG. 1C). Further, in comparing the seat assemblies' position in FIG. 1B to FIG. 1C, the seat assemblies 10 are also shown moved to a forward position along the track assembly 18 for providing adequate legroom within the vehicle interior 4 for a seat occupant in a rearward-facing configuration.

Referring now to FIG. 2A, the seat assembly 10 is shown disposed within the vehicle interior 4 of the vehicle 2 at the front portion 12 of the vehicle 2. The instrument panel 8 of the vehicle 2 in the embodiment shown in FIG. 2A includes a steering wheel assembly 9 extending outwardly therefrom. In FIG. 2A, a seat occupant 26 is shown positioned within the seat assembly 10 in a seated position with the seat portion 20 of the seat assembly 10 in the deployed position. In FIG. 2A, a swivel mechanism 30 is shown slideably supported on the track assembly 18 between fore and aft positions. The swivel mechanism 30 is configured to provide the rotating movement of the seat assembly 10 between the forward-facing and rearward-facing configurations. A base frame 32 is mounted on the swivel mechanism 30 for rotational movement therewith, and includes a support bracket 34B interconnecting the seat portion 20 with the seatback 22. With the swivel mechanism 30 coupled to the base frame 32 of the seat assembly 10, the entire seat assembly 10 is configured to rotate along the pivot axis PA which is centrally disposed on the swivel mechanism 30. In FIG. 2A, a radius R1 is defined between the centrally disposed pivot axis PA and a front edge 28 of the seat portion 20. Thus, it is contemplated that the front edge 28 of the seat portion 20 defines the furthest point, or forward-most portion, of the seat assembly 10 from the pivot axis PA to define the rotational footprint RF1 (FIG. 1A) of the seat assembly 10 when the seat portion 20 is in the deployed position.

Figure 2B:
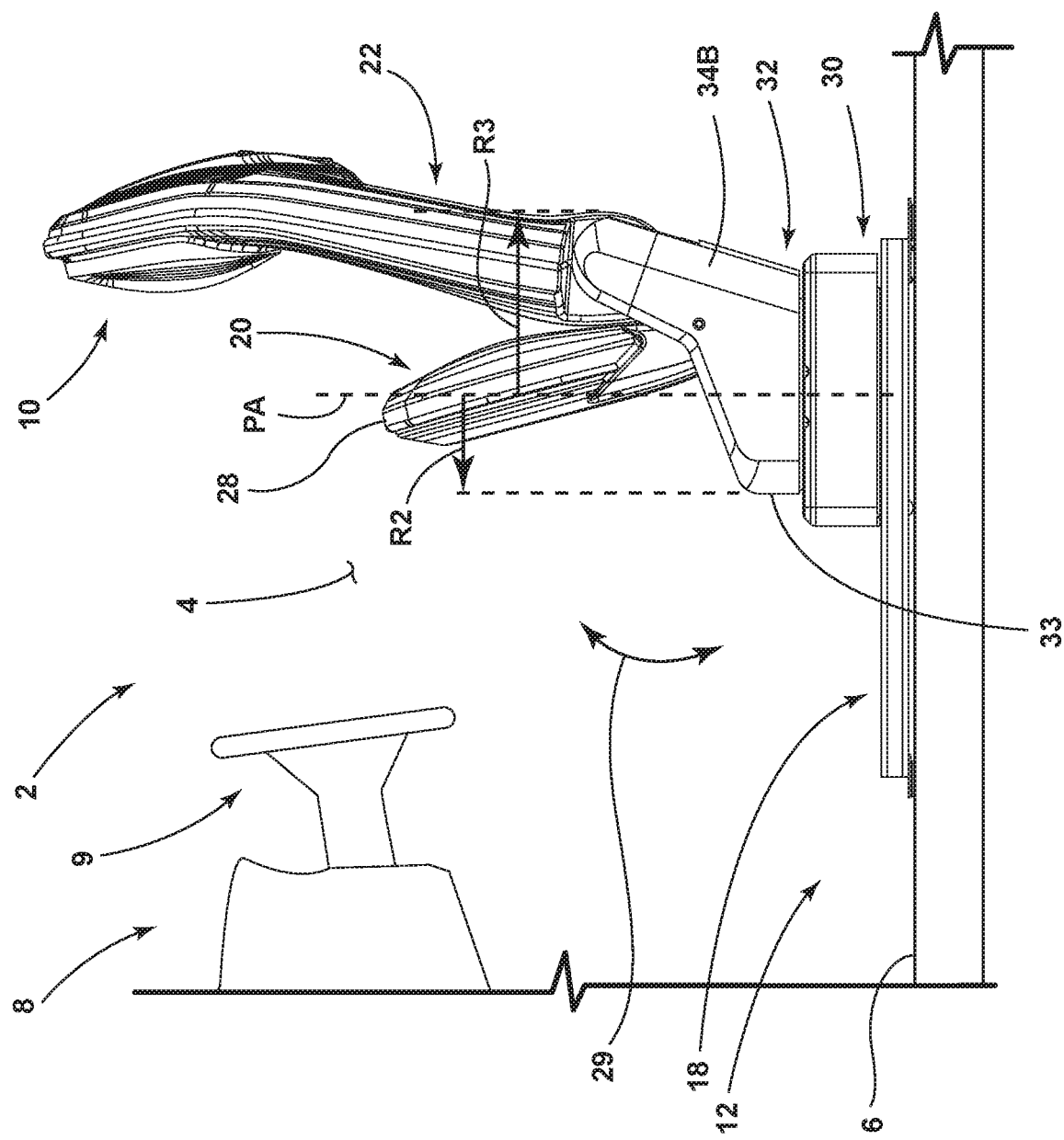
FIG. 2B is a side elevational view of the seat assembly of FIG. 2A with the seat portion shown in a stowed position.

Referring now to FIG. 2B, the seat assembly 10 is shown with the seat portion 20 disposed in the stowed position. It is contemplated that the seat portion 20 moves from the deployed position (FIG. 2A) to the stowed position (FIG. 2B) by pivoting upward along the path as indicated by arrow 29. In FIG. 2B, the radius R2 is defined between the centrally disposed pivot axis PA and a forward-most portion of the seat assembly 10, which is contemplated to be a front edge 33 of the base frame 32, or may be any perimeter edge of the base frame 32. This is due to the front edge 33 of the base frame 32 being disposed outwardly in a forward direction beyond the front edge 28 of the seat portion 20 when the seat portion 20 is in the upright non-use or stowed position. Thus, the radius R2 is used to define the rotational footprint RF2 (FIG. 1B) of a lower portion of the seat assembly 10 to minimize the rotational footprint of the seat assembly 10 for rotation within the vehicle interior 4. In FIG. 2B, the seatback 22 has moved to a vertical positon to further reduce the rotational footprint of an upper portion of the seat assembly 10. In FIG. 2B, a radius R3 is defined between the centrally disposed pivot axis PA and a perimeter edge of the seatback 22. Radius R3 defines a rotational footprint of the seat assembly 10 at a position disposed above the lower portion of the seat assembly 10 where the rotational footprint is defined by radius R2. As shown in FIG. 2B radius R3 is contemplated to be larger than radius R2.

As further shown in FIG. 2B, the front edge 28 of the seat portion 20 is vertically juxtaposed over the lower portion of the seat assembly 10. The base frame 32 and the swivel mechanism 30 define the lower portion of the seat assembly 10. As used herein, the term "vertically juxtaposed" is used to describe a component or feature that is positioned vertically above and over another feature. Specifically, the front edge 28 of the seat portion 20 is shown vertically disposed above the swivel mechanism 30, such that the front edge 28 is vertically juxtaposed over the swivel mechanism 30. In comparison, the front edge 28 of the seat portion 20 is shown in FIG. 2A as being vertically above the swivel mechanism 30 and the front edge 33 of the base frame 32. However, the front edge 28 is shown in FIG. 2A as being positioned in a forward direction beyond the swivel mechanism 30 and the front edge 33 of the base frame 32. In FIG. 2B, the front edge 28 of the seat portion 20 is disposed above and over the swivel mechanism 30 and the base frame 32, such that the front edge 28 of the seat portion 20 is shown in FIG. 2B as vertically juxtaposed over the swivel mechanism 30 and the base frame 32, when the seat portion 20 is in the stowed position. Put differently, the components of the lower portion of the seat assembly 10 have a footprint. These components include the base frame 32 and the swivel mechanism 30. When the seat portion 20 is vertically juxtaposed to any one of the aforementioned components, the seat portion 20 and the front edge 28 thereof, are contemplated to be vertically positioned above and within the footprint of the referenced component.

As noted above, the seat portion 20 of the seat assembly 10 is configured to pivotally move between the deployed position (FIG. 2A) and the stowed position (FIG. 2B) along the path as indicated by arrow 29 (FIG. 2B). The deployed position of the seat portion 20 provides for an upper surface configured for supporting a seat occupant thereon. As such, the deployed position of the seat portion 20 may be referred to herein as a "use position" or a "horizontal use position." With reference to FIG. 2B, the seat portion 20 is shown in the stowed position, which may also be referred to herein as the "upright non-use position." The seat portion 20 is considered to be in a non-use position when the seat portion 20 is in the stowed position due to the highly increased angle of the seat portion 20 when in the stowed position. Thus, while known seat assemblies may provide for a seat portion that can adjust to provide various angled configurations, the seat assembly 10 of the present concept provides for a seat portion 20 which can move to upright non-use positions, wherein front edge 28 thereof is vertically juxtaposed over the base frame 32 and/or the swivel mechanism 30. Such dynamic angle adjustment of a seat portion is not found in seat assemblies which provide for fine tuning the angle of the seat portion for comfort adjustments only. With this range of movement, the seat portion 20 of the present concept provides for a seat portion that can effectively reduce the rotational footprint of the overall seat assembly 10 for accommodating pivoting movement of the seat assembly 10 within a vehicle interior.

Figure 2C:
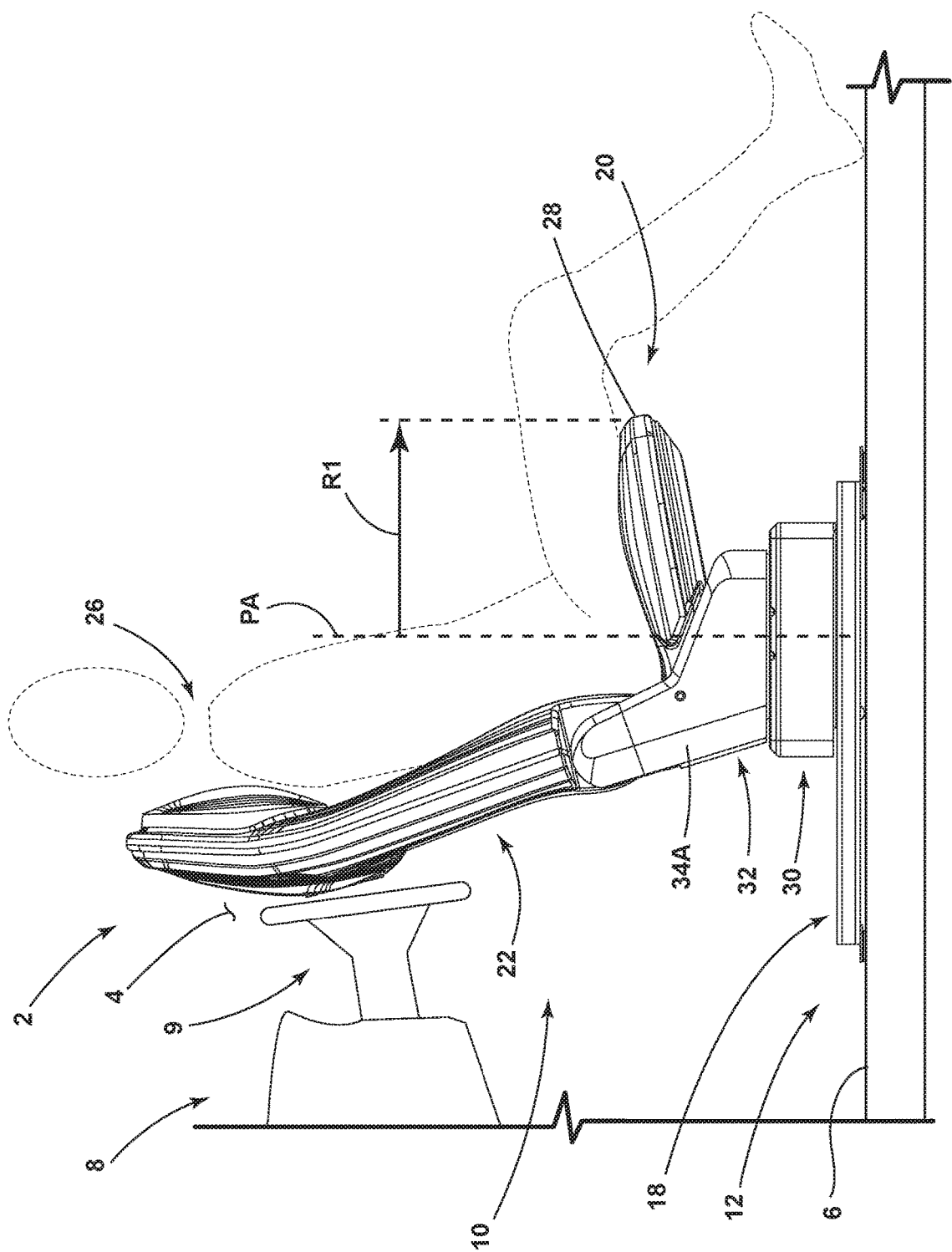
FIG. 2C is a side elevational view of the vehicle seat of FIG. 2A with the vehicle seat in a rearward-facing configuration.

Referring now to FIG. 2C, the seat occupant 26 is shown seated in the seat assembly 10 in a rearward-facing configuration. With the seat assembly 10 rotated to the rearward-facing configuration, a support bracket 34A is shown on the base frame 32, and contemplated to be opposed to the support bracket 34B shown in FIGS. 2A and 2B. With the seat portion 20 shown in the deployed or use position in FIG. 2C, the seat assembly 10 includes a radius R1 defined between the centrally disposed pivot axis PA and the front edge 28 of the seat portion 20 which is no longer vertically juxtaposed over the base frame 32, but rather extending forward from the base frame 32 above the base frame 32. It is further contemplated that in the rearward-facing configuration, the seat assembly 10 may be disposed on a side of the front portion 12 of the vehicle interior 4 where the seat assembly 10 can move towards the instrument panel 8 on the track assembly 18 to provide more legroom for other occupants that may be seated in seat assemblies positioned in the intermediate portion 14 of the vehicle 2, such as seat assemblies 11 shown in FIG. 1A.

Figure 3A:
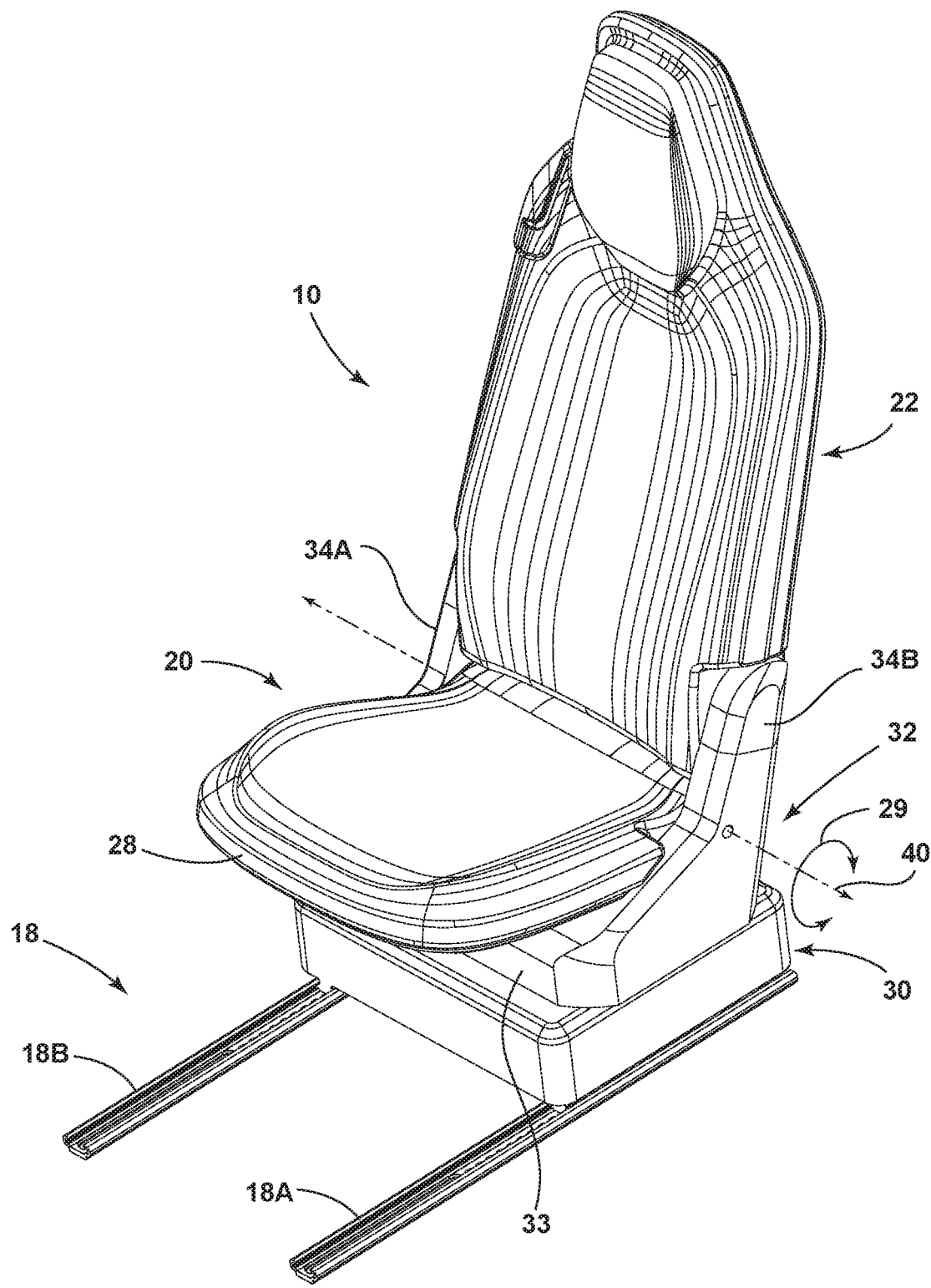
FIG. 3A is a top perspective view of the seat assembly of FIG. 2A as removed from the vehicle interior.

Referring now to FIG. 3A, the seat assembly 10 is shown removed from the vehicle interior 4 and mounted to the track assembly 18 which includes first and second track members 18A, 18B. As noted above, the swivel mechanism 30 is slideably coupled to the track members 18A, 18B of the track assembly 18 for movement of the seat assembly 10 between fore and aft positions along the track assembly 18. In FIG. 3A, the seat portion 20 is shown in the deployed position and the seatback 22 is shown in a partially reclined position. Thus, in the embodiment of FIG. 3A, the seat assembly 10 is contemplated to be in a use position for supporting a vehicle occupant. As noted above, the seat portion 20 is contemplated to be a pivoting members that is pivotally coupled between the support brackets 34A, 34B of the base frame 32 along pivot axis 40 for movement between use and non-use positions.

Figure 3B:
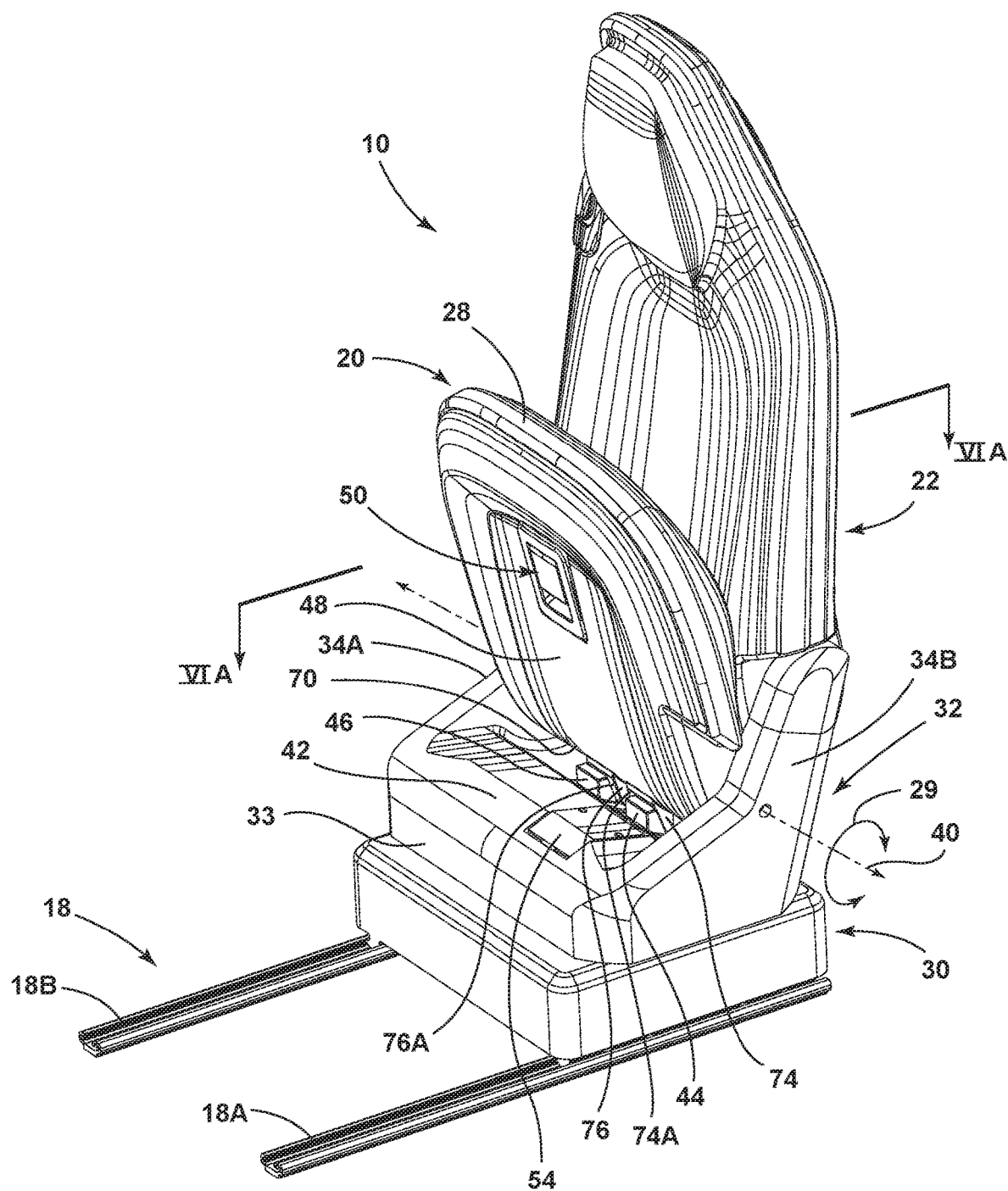
FIG. 3B is a top perspective view of the seat assembly of FIG. 2B as removed from the vehicle interior.

Referring now to FIG. 3B, the seat portion 20 of the seat assembly 10 is shown having been pivoted from the use position shown in FIG. 3A to the upright non-use position shown in FIG. 3B. The pivoting movement of the seat portion 20 occurs along the pivot axis 40 in the direction as indicated by arrow 29. With the seat portion 20 in the upright non-use portion, a support surface 42 of the base frame 32 is shown being disposed between the support brackets 34A, 34B. As shown in FIG. 3B, the support brackets 34A, 34B upwardly extend from the support surface 42 of the base frame 32. Centrally disposed along the support surface 42, first and second abutment members 44, 46 upwardly extend and are shown engaged with reciprocal first and second abutment members 74, 76 disposed on a rear portion 70 of the seat portion 20, as further described below. In accordance with the present concept, when the seat portion 20 is moved to the upright non-use position, the seatback 22 also moves to an upright position, as shown in FIG. 3B, to further reduce the overall rotational footprint of the seat assembly 10. Coordinated movement of the seat portion 20 and the seatback 22 is further described below. With the seat portion 20 in the upright non-use position, the front edge 28 thereof is shown as being vertically juxtaposed over the base frame 32 and the swivel mechanism 30 to reduce the overall rotational footprint of the seat assembly 10. With the seat portion 20 in the upright non-use position, an underside 48 of the seat portion 20 is shown and includes a release mechanism 50 disposed thereon. In use, the release mechanism 50 is configured to release a lock mechanism to allow for rotation of the seat assembly 10 along the pivot axis PA (FIGS. 2A-2C) of the swivel mechanism 30. Thus, when a user moves the seat portion 20 to the upright non-use position, the seatback 22, moves to an upright position, such that the seat assembly 10 is now ready for swiveling movement along the pivot axis PA of the swivel mechanism 30 within a vehicle interior. Further, the seat assembly 10 can be moved between fore and aft positions along the track assembly 18 to provide increased cargo space within a vehicle interior.

Figure 3C:
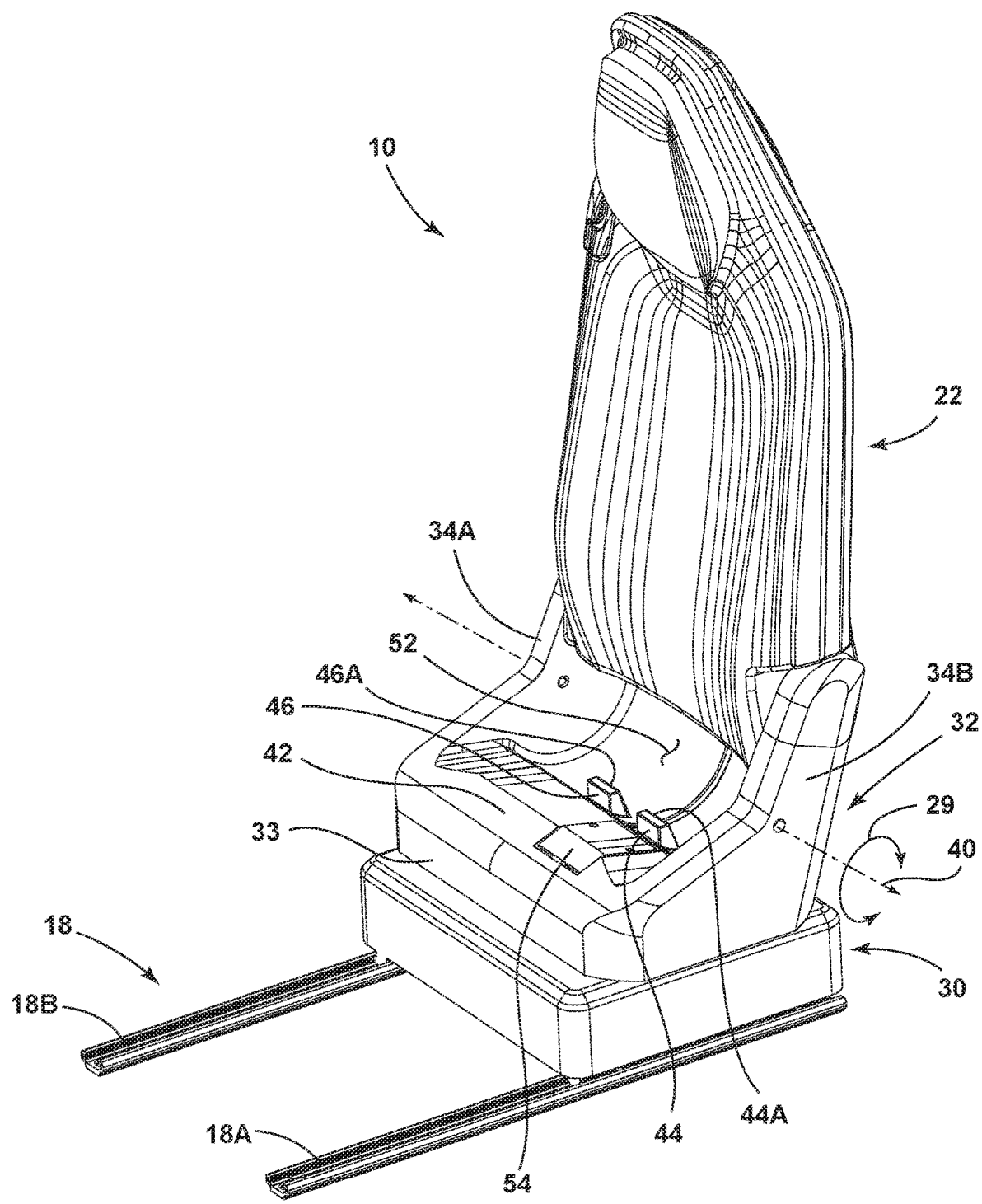
FIG. 3C is a top perspective view of the seat assembly of FIG. 3B with the seat portion removed therefrom to reveal the base frame.

Referring now to FIG. 3C, the seat portion 20 of the seat assembly 10 has been removed to reveal a rear well 52 of the support surface 42 of the base frame 32. In use, the rear well 52 of the base frame 32 provides adequate space for a rear portion 70 (FIG. 4A) of the seat portion 20 to rotate between the deployed and upright positions. The first and second abutment members 44, 46 are shown disposed adjacent to the rear well 52 of the base frame 32 and include rear surfaces 44A, 46A, respectively. The rear surfaces 44A, 46A of the respective first and second abutment members 44, 46 abut front surfaces 74A, 76A of the abutment members 74, 76 of the seat portion 20 when the seat portion 20 is in the upright non-use position, as shown in FIG. 3B. As further shown in FIG. 3C, the base frame 32 includes a cover 54 which is contemplated to be a removable cover concealing a lock mechanism 60 (FIG. 3D) for the seat assembly 10 as further described below.

Figure 3D:
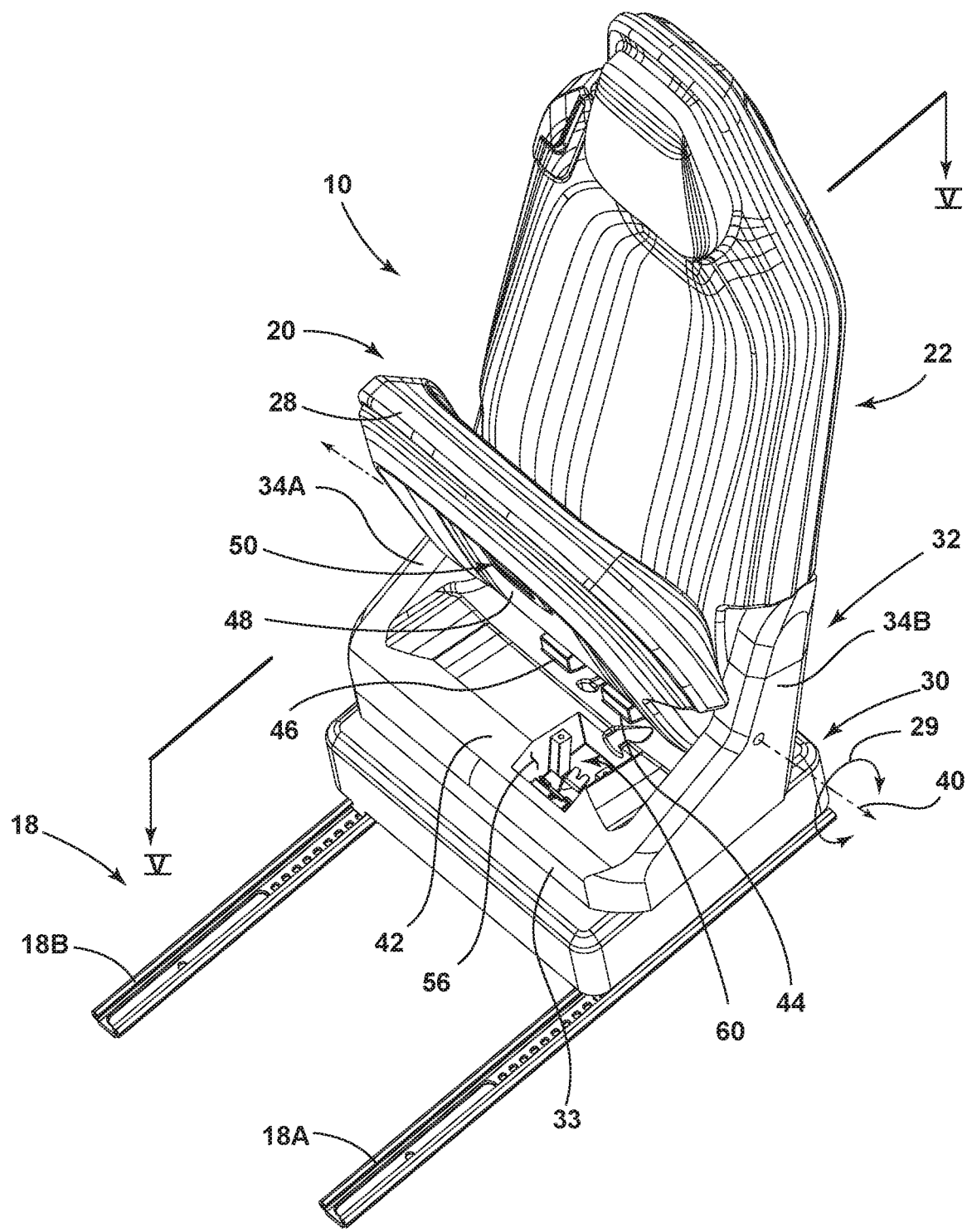
FIG. 3D is a top perspective view of the seat assembly of FIG. 3B with a cover removed from the base frame to reveal a lock mechanism.

Referring now to FIG. 3D, the cover 54 of the base frame 32 has been removed to reveal a cavity 56 having a lock mechanism 60 disposed therein. The lock mechanism 60 is contemplated to be a releasable lock mechanism that is released using the release mechanism 50 disposed on the underside 48 of the seat portion 20, as further described below.

Figure 4A:
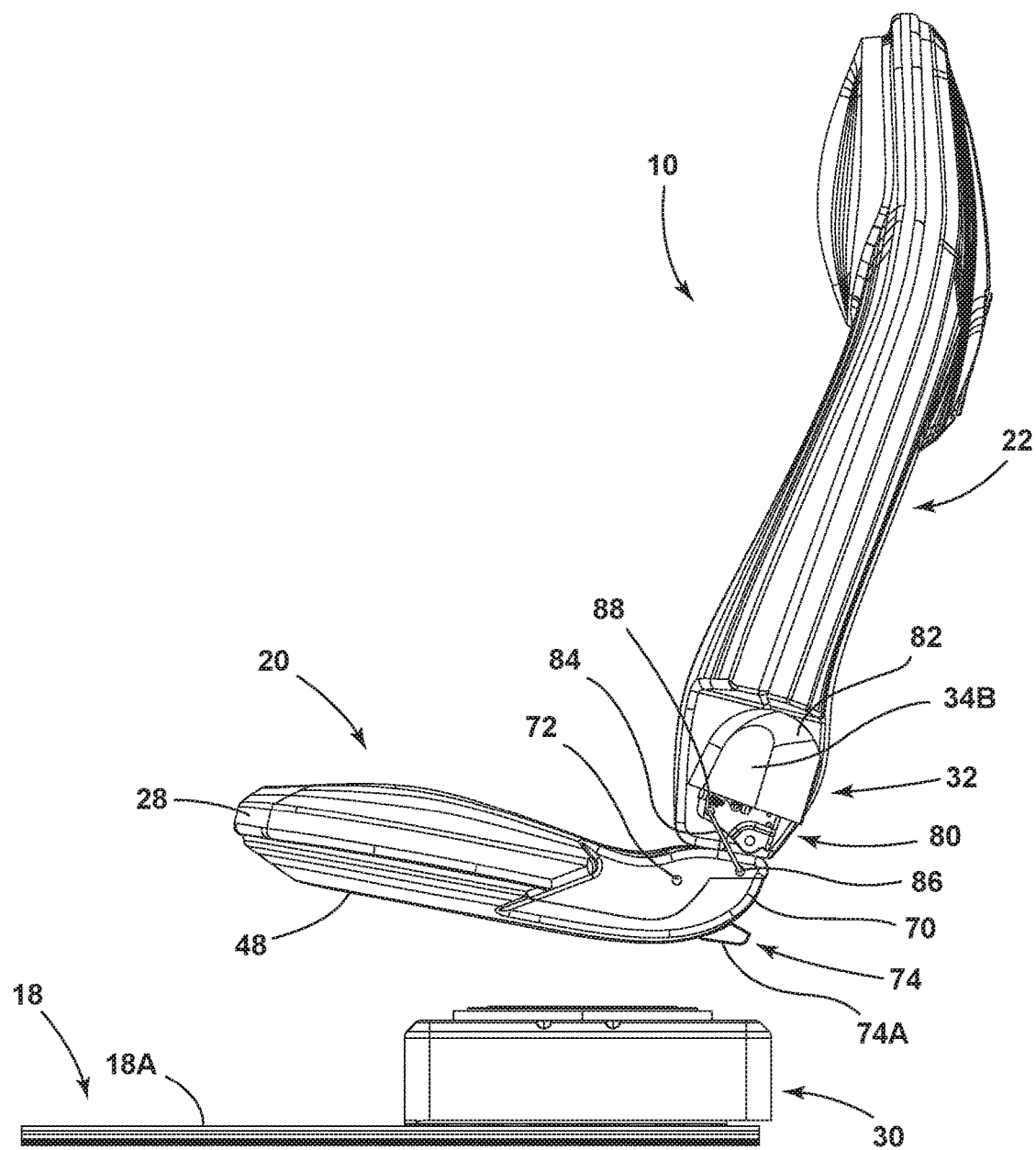
FIG. 4A is a side elevation view of the seat assembly of FIG. 3A with the base frame removed therefrom.

Referring now to FIG. 4A, the seat assembly 10 is shown with the base frame 32 removed therefrom. The seat portion 20 is shown with the rear portion 70 having a pivot point 72 which connects to support bracket 34B of the base frame 32 along the pivot axis 40 as shown in FIG. 3A. The rear portion 70 of the seat portion 20 further includes the first and second abutment members 74, 76 extending outwardly therefrom, wherein abutment member 74 alone is shown in FIG. 4A. The abutment member 74 rearwardly extends from the rear portion 70 of the seat portion 20 and includes the front surface 74A configured to abut rear surface 44A of abutment member 44 of the base frame 34 when the seat portion 20 is moved to the upright non-use position, as shown in FIG. 3B. As further shown in FIG. 4A, a recliner mechanism 80 is shown disposed in an upper portion 82 of the support bracket 34B of the base frame 32. The recliner mechanism 80 is configured to pivotally couple the seatback 22 between the support brackets 34A, 34B of the base frame 32. It is further contemplated that an exterior handle may be provided that is interconnected with the recliner mechanism 80 to release the recliner mechanism 80 for pivoting movement of the seatback 22 relative to the base frame 32. Such an exterior handle may be positioned somewhere along the base frame 32, and most likely positioned on one of the support brackets 34A, 34B.

Figure 4B:
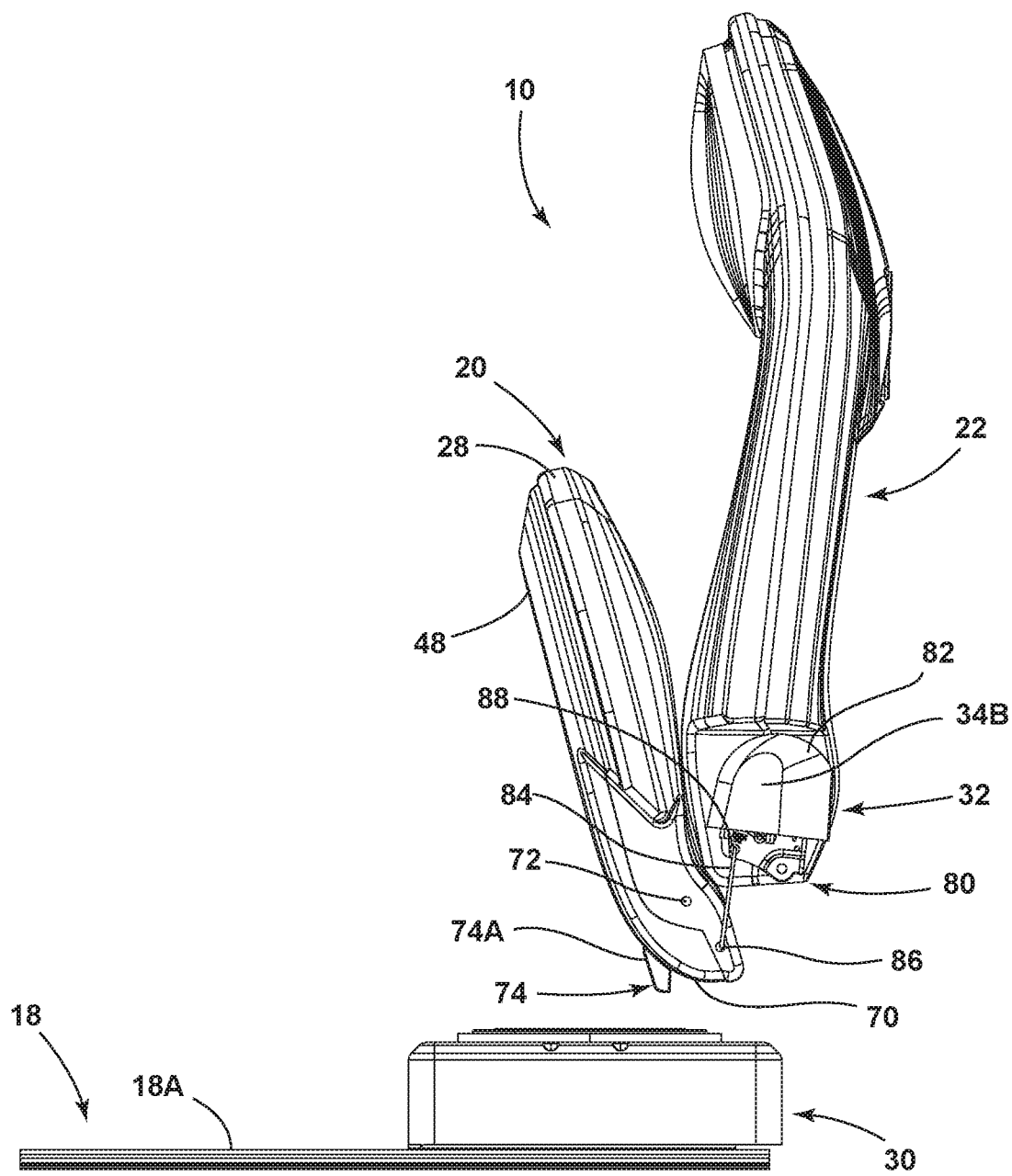
FIG. 4B is a side elevation view of the seat assembly of FIG. 3B with the base frame removed therefrom.

As further shown in FIG. 4A, the rear portion 70 of the seat portion 20 is operably coupled to the recliner mechanism 80 by an attachment mechanism 84 shown in the form of a cable. The attachment mechanism 84 includes first and second ends 86, 88, wherein the first end 86 is coupled to the rear portion 70 of the seat portion 20, while the second end 88 is coupled to the recliner mechanism 80. In this way, as the seat portion 20 moves from the deployed or use position shown in FIG. 4A to the upright non-use position shown in FIG. 4B, the attachment mechanism 84 will act on the recliner mechanism 80 as the attachment mechanism 84 is pulled downward by the downward pivoting movement of the rear portion 70 of the seat portion 20. In this way, the movement of the seat portion 20 to the upright non-use position shown in FIG. 4B releases the recliner mechanism 80, via the attachment mechanism 84, from a locked condition to an unlocked condition to allow for forward movement of the seatback 22 to an upright position. It is contemplated that the seatback 22 is biased towards the upright position shown in FIGS. 2B, 3B and 4B, such that release of the recliner mechanism 80 causes forward movement of the seatback 22 to the upright position. Thus, the interconnection of the seat portion 20 with the seatback 22 via the attachment mechanism 84 provides for a synchronized positioning of the seat portion 20 and the seatback 22 to a configuration providing a reduced overall rotational footprint for the seat assembly 10, as shown in FIG. 4B.

Figure 5:
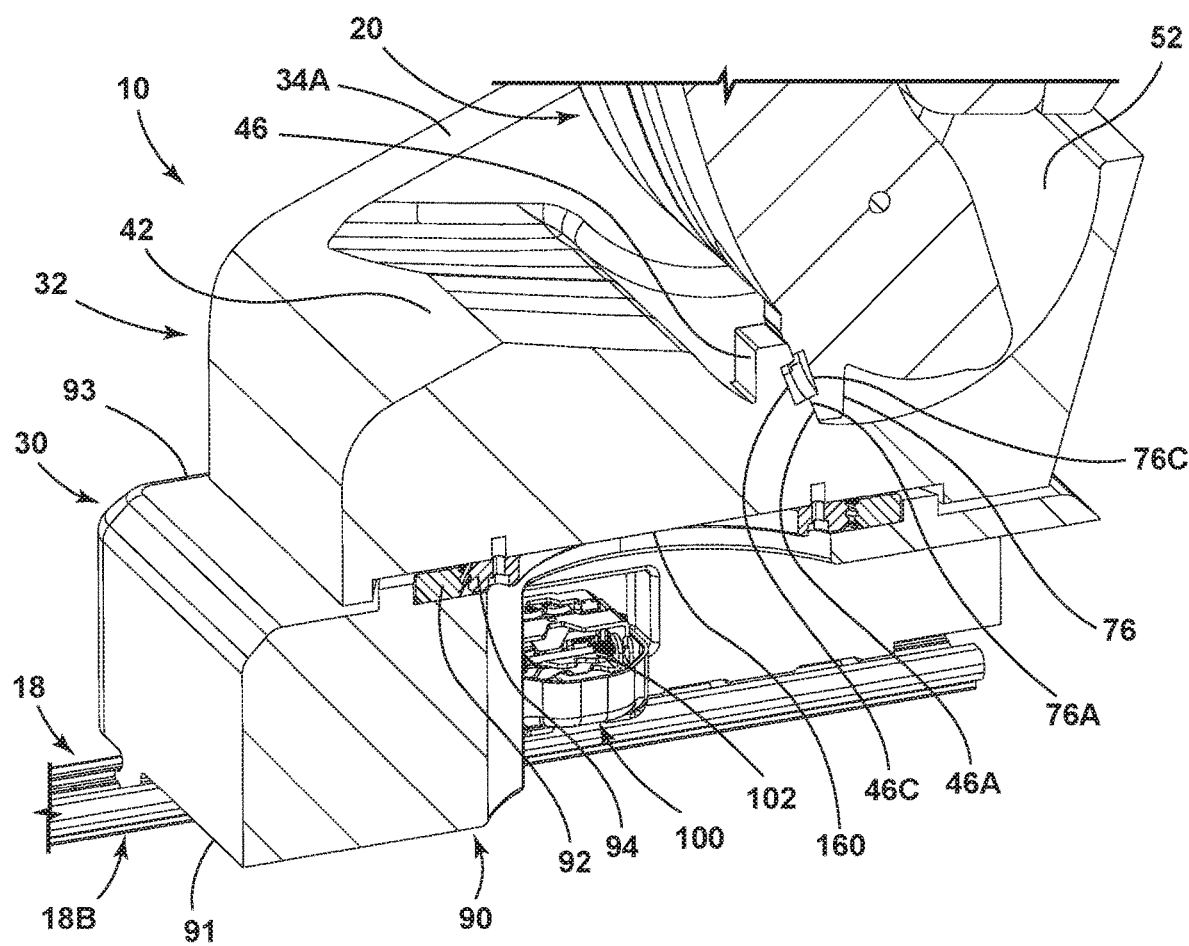
FIG. 5 is a cross-sectional view of the seat assembly of FIG. 3D taken at line V.

Referring now to FIG. 5, a cross-sectional view of the seat assembly 10 is shown with the seat portion 20 in the upright non-use position. In FIG. 5, the second abutment member 46 of the base frame 32 is shown abutting the second abutment member 76 of the seat portion 20. Specifically, the rear surface 46A of the second abutment member 46 of the base frame 32 abuts the front surface 76A of the second abutment member 76 of the seat portion 20. The second abutment members 46, 76 include inset portions 46C, 76C, respectively. It is contemplated that magnetic member are disposed within the inset portions 46C, 76C to magnetically couple the second abutment member 46 of the base frame 32 with the second abutment member 76 of the seat portion 20, as shown in FIG. 6C. Magnets suitable to magnetically couple the second abutment members 46, 76 may include a magnetized magnetic member, and a reciprocal magnetic member, wherein the reciprocal magnetic member may include a magnetic member, or may include a non-magnetized metal material to which a magnetic member is attracted for coupling thereto. In this way, the seat portion 20 can be retained in the upright non-use position by a magnetic coupling between the seat portion 20 and the base frame 32 at the second abutment members 46, 76 thereof. The description of the second abutment members 46, 76 provided with reference to FIG. 5 is also contemplated to describe the magnetic engagement of the first abutment members 44, 74 of the base frame 32 and the seat portion 20, respectively.

As further shown in FIG. 5, the swivel mechanism 30 includes a base portion 90 that is slideably coupled to the track assembly 18 at a lower surface 91 thereof. The base portion 90 further includes an upper surface 93 having an outer ring member 92 coupled thereto. The swivel mechanism 30 further includes an inner ring member 94 which is coupled to a bottom surface 160 of the base frame 32. The inner and outer ring members 94, 92 are contemplated to be rotatably engaged with one another, such that the inner ring 94 can rotate with the base frame 32 as the seat assembly 10 moves from forward-facing to rearward-facing configurations. As further shown in FIG. 5, a lock mechanism 100 is operably coupled to the swivel mechanism 30 and is operable between locked at unlocked conditions with respect to the track assembly 18. Specifically, the lock mechanism 100 is shown coupled to track member 18B and includes a pivoting tab 102 which pivots to move the lock mechanism 100 between the locked and unlocked conditions, as further described below.

Figure 6A:
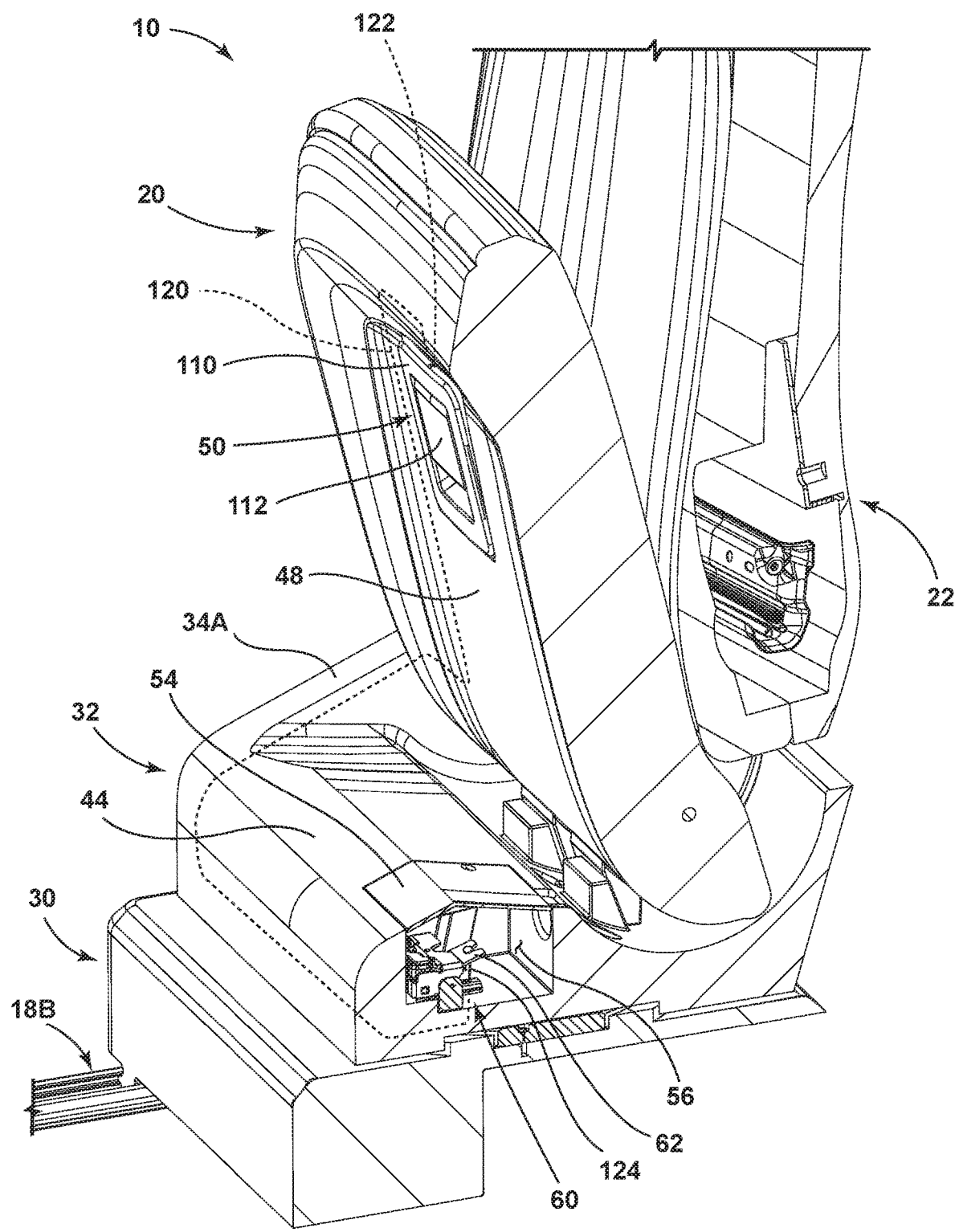
FIG. 6A is a cross-sectional view of the seat assembly of FIG. 3B taken at line VIA.

Referring now to FIG. 6A, the seat assembly 10 is shown with the seat portion 20 in the upright non-use position, such that the release mechanism 50 is accessible to a user. The release mechanism 50 is substantially disposed within the seat portion 20 and includes a housing 110 to which a handle 112 is pivotally coupled. The handle 112 is shown in FIG. 6A in a first position and is contemplated to be operable to a second position shown in FIG. 6B. An attachment mechanism 120 includes a first end 122 that is operably coupled to the release mechanism 50 at the handle 112 thereof. The attachment mechanism 120 further includes a second end 124 which is operably coupled to the lock mechanism 60 disposed within the base frame 32. Specifically, the second end 124 of the attachment mechanism 120 is operably coupled to a tab 62 of the lock mechanism 60 for movement of the lock mechanism 60 between locked and unlocked conditions. The attachment mechanism 120 is contemplated to be a cable member which is routed through the seat portion 20 and the base frame 32 to interconnect the release mechanism 50 and the lock mechanism 60.

Figure 6B:
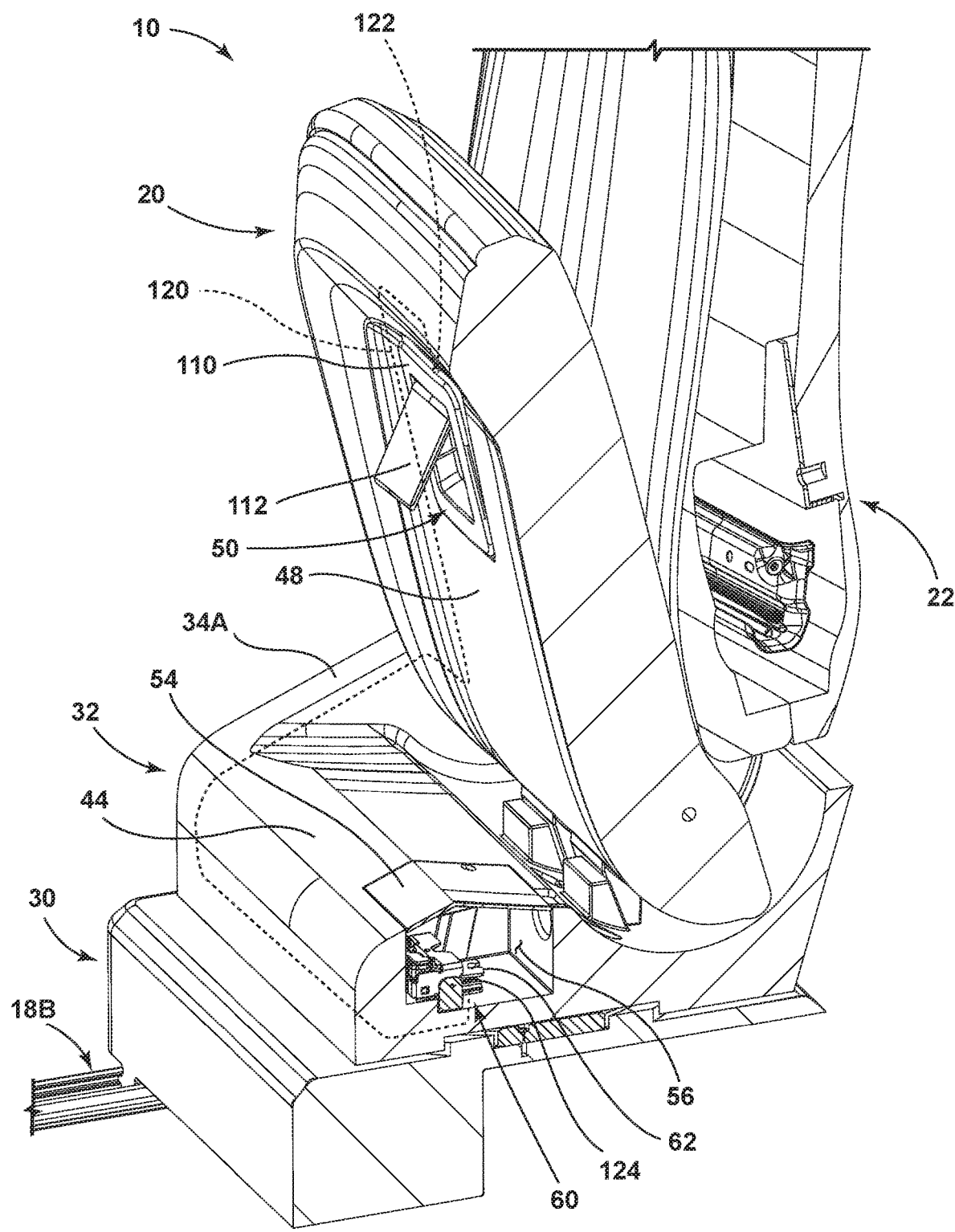
FIG. 6B is a cross-sectional view of the seat assembly of FIG. 3B taken at line VIA with a release mechanism and lock mechanism shown in release and unlocked positions, respectively.
Figure 6C:
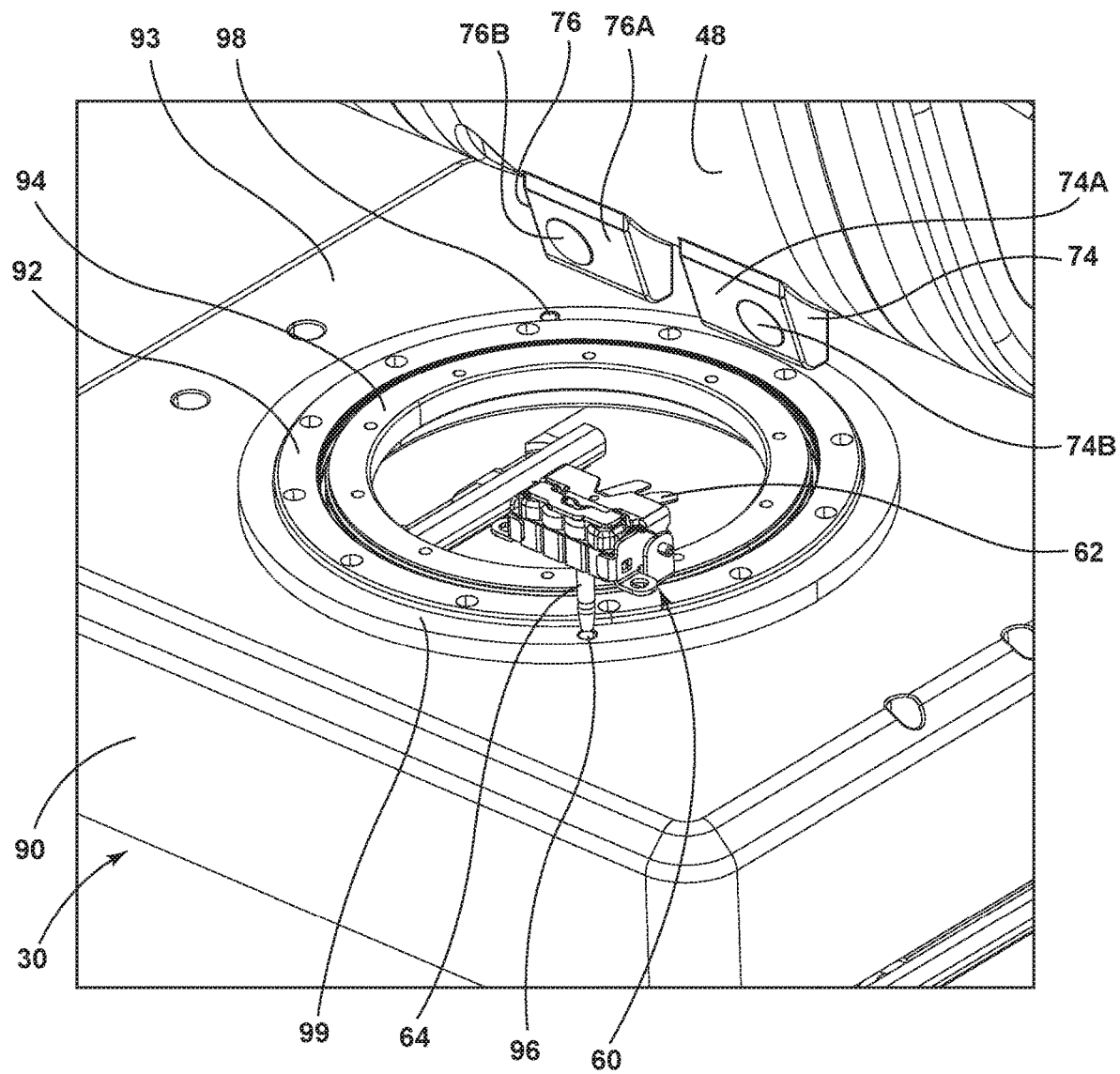
FIG. 6C is a top perspective view of a swivel mechanism and associated lock mechanism.

With specific reference to FIG. 6B, the handle 112 of the release mechanism 50 is shown having being moved from the first position (FIG. 6A) to the second position (FIG. 6B). With the handle 112 in the second position, it is contemplated that the attachment mechanism 120 has been pulled to move the tab 62 of the lock mechanism 60 downwardly, such that the lock mechanism 60 is in an unlocked condition in FIG. 6B.

Figure 7A:
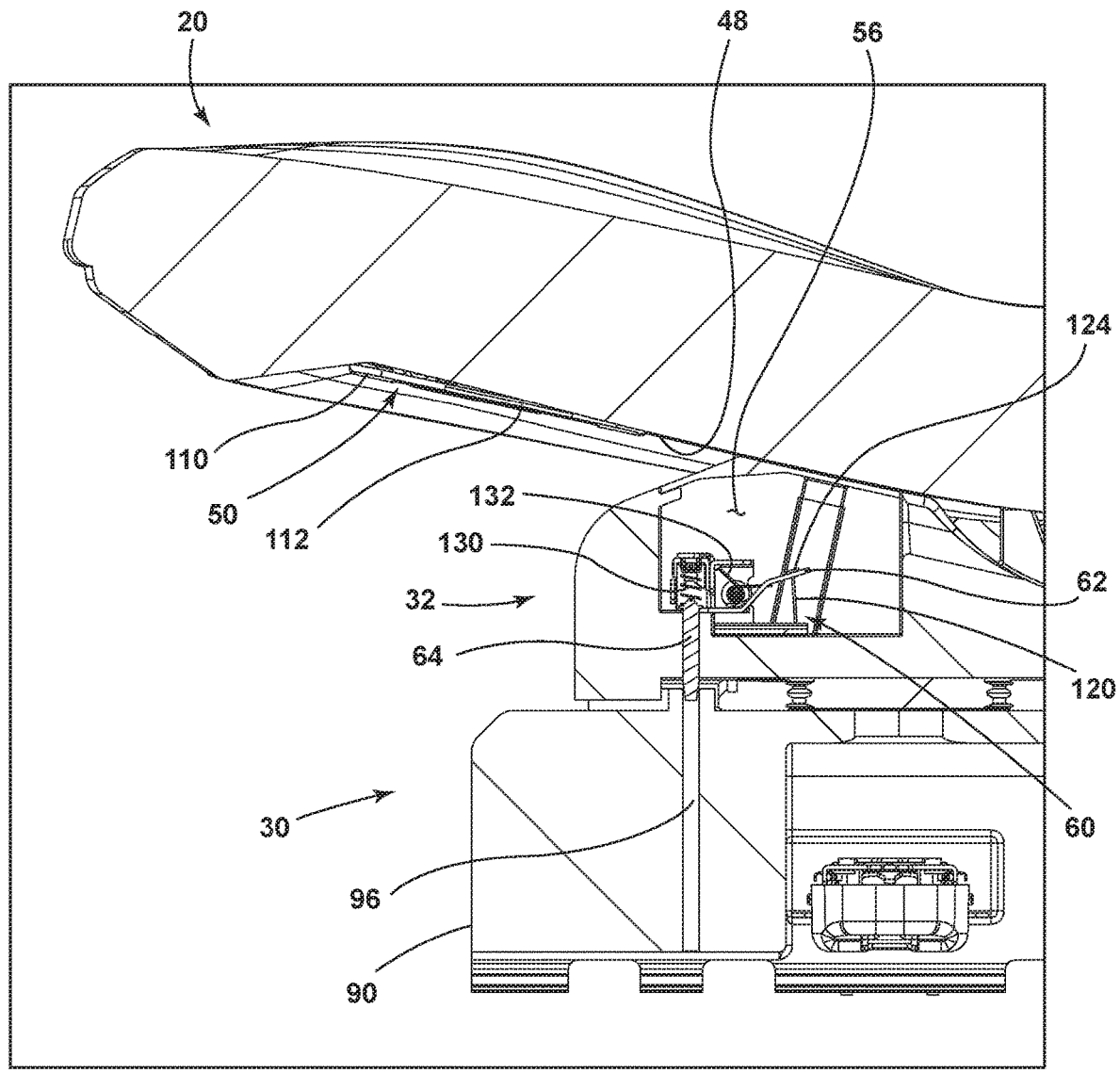
FIG. 7A is a cross sectional view of a seat assembly showing a lock mechanism in a locked position.

Referring now to FIG. 6C, the lock mechanism 60 is again shown in the unlocked position, wherein a pin 64 of the lock mechanism 60 is shown in a retracted position relative to a first receiving aperture 96 of the swivel mechanism 30. The pin 64 is operable between retracted and deployed positions based on a condition of the lock mechanism 60. In the unlocked condition of the lock mechanism 60, the pin 64 is in the retracted position, wherein it is contemplated that the handle 112 of the release mechanism 50 is in the second position. With the lock mechanism 60 in the unlocked condition, the seat assembly 10 is prepared for rotation along the pivot axis PA defined by the swivel mechanism 30 from the forward-facing configuration to the rearward-facing configuration. The receiving aperture 96 of the swivel mechanism 30 corresponds to the forward-facing configuration of the seat assembly 10. As such, when the pin 64 of the lock mechanism 60 is deployed received within the first receiving aperture 96, as shown in FIG. 7A, the seat assembly 10 is contemplated to be in the forward-facing configuration. The swivel mechanism 30 further includes a second receiving aperture 98 disposed in a position 180° from the first receiving aperture 96. When a user unlocks the lock mechanism 60 using the release mechanism 50, the user is then free to rotate the base frame 32 relative to the swivel mechanism 30 to move the seat assembly 10 to a rearward-facing configuration. The pin 64 of the lock mechanism 60 is biased toward the deployed position, such that the pin 64 can abut and ride along a guide surface 99 towards the second receiving aperture 98 of the swivel mechanism 30. Once the pin 64 of the lock mechanism 60 is aligned with the second receiving aperture 98 of the swivel mechanism 30, the pin 64 will move from the retracted position to the deployed position, as biased thereto and be deployed and received within the second receiving aperture 98. In this way, the seat assembly 10 is configured to retain a rearward-facing or forward-facing configuration selected by a user.

As further shown in FIG. 6C, magnetic members 74B, 76B are shown disposed in the first and second abutment members 74, 76, respectively, of the seat portion 20. Again, the magnetic members 74B, 76B can be inserted into the inset portions 74C, 76C of the first and second abutment members 74, 76, respectively, as shown in FIG. 5. The magnetic members 74B, 76B may be permanent magnets, or other like magnetized material. In this way, a reciprocal magnetic member can be positioned on the first and second abutment members 44, 46 at the rear surfaces 44A, 46A thereof, in the form of a magnetized member or a metal plate.

Figure 7B:
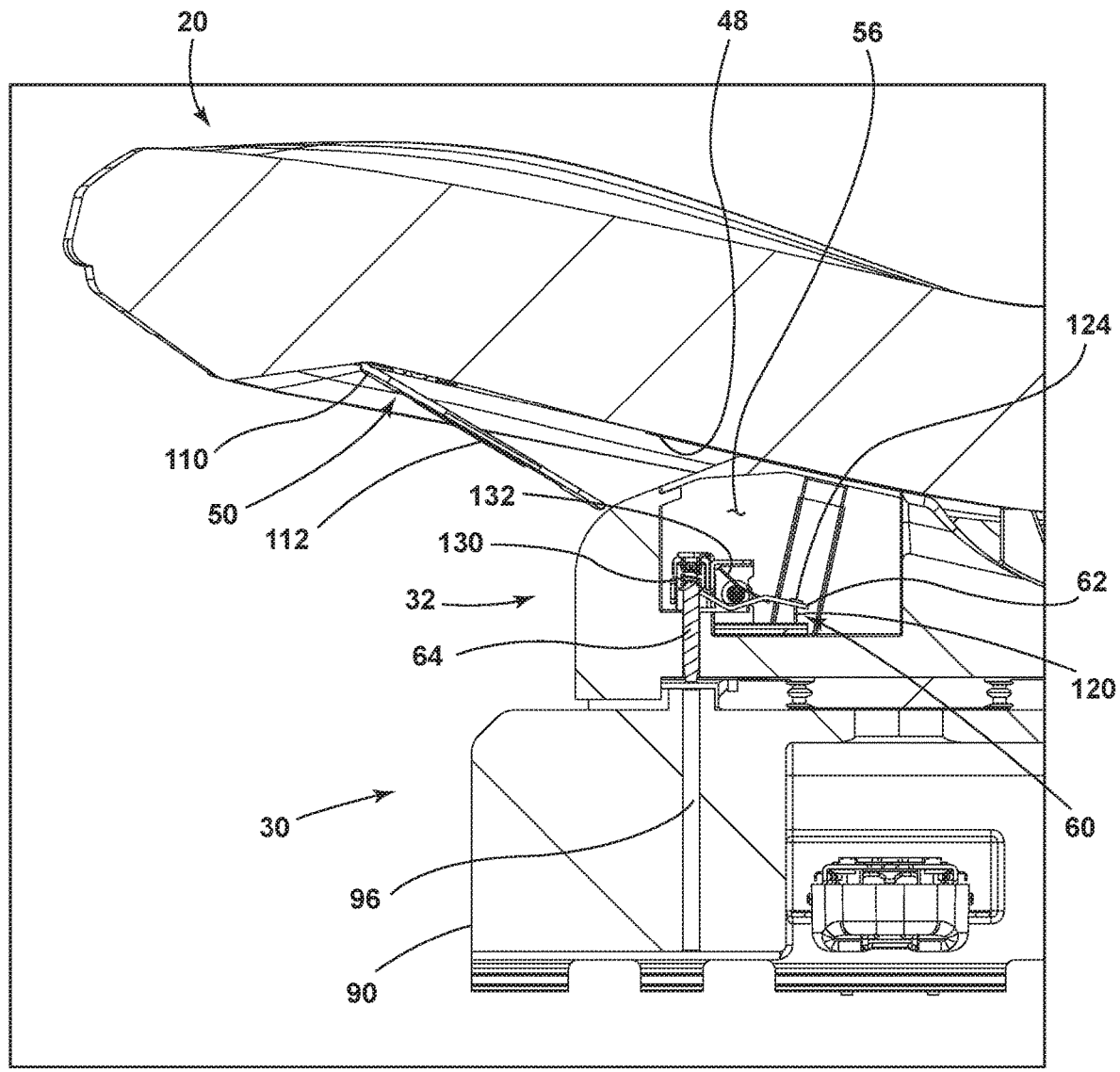
FIG. 7B is a cross sectional view of the seat assembly of FIG. 7A showing the lock mechanism in an unlocked position.

Referring now to FIGS. 7A and 7B, the lock mechanism 60 is shown in the locked position (FIG. 7A) and the unlocked position (FIG. 7B). In the locked position shown in FIG. 7A, the pin 64 of the lock mechanism 60 is received within the first receiving aperture 96 of the swivel mechanism 30. The lock mechanism 60 includes a first biasing mechanism 130 shown in the form of a coil spring which biases the pin 64 to the deployed position as shown in FIG. 7A. As further shown in FIG. 7A, the lock mechanism 60 includes a second biasing mechanism 132 in the form of a torsion spring which acts on the tab 62 of the lock mechanism 60. In FIG. 7B, the handle 112 of the release mechanism 50 has been moved to the second position from the first position which thereby moves the tab 62 of the lock mechanism 60 in a downward manner via the attachment mechanism 120. Movement of the handle 112 from the first position to the second position overcomes the forces of the first and second biasing mechanisms 130, 132 to move the tab 62 of the lock mechanism 60 downward which correlates into the pin 64 being moved to the retracted position and out of engagement with receiving aperture 96. Thus, in the embodiment shown in FIG. 7B, the seat assembly 10 is prepared for rotation along the pivot axis PA. When the handle 112 is released, the first and second biasing mechanisms 130, 132 will act on the pin 64 and tab 62 of the lock mechanisms 60 to urge the pin 64 to the deployed position and further urge the tab 62 in an upward motion to the position shown in FIG. 7A. While the seat portion 20 shown in FIG. 7B is in the deployed or use position, it is contemplated that the swiveling functionality of the seat assembly 10 is more commonly initiated when the seat portion 20 is in the upright non-use position for which the seat assembly 10 has an overall reduced rotational footprint.

Figure 8:
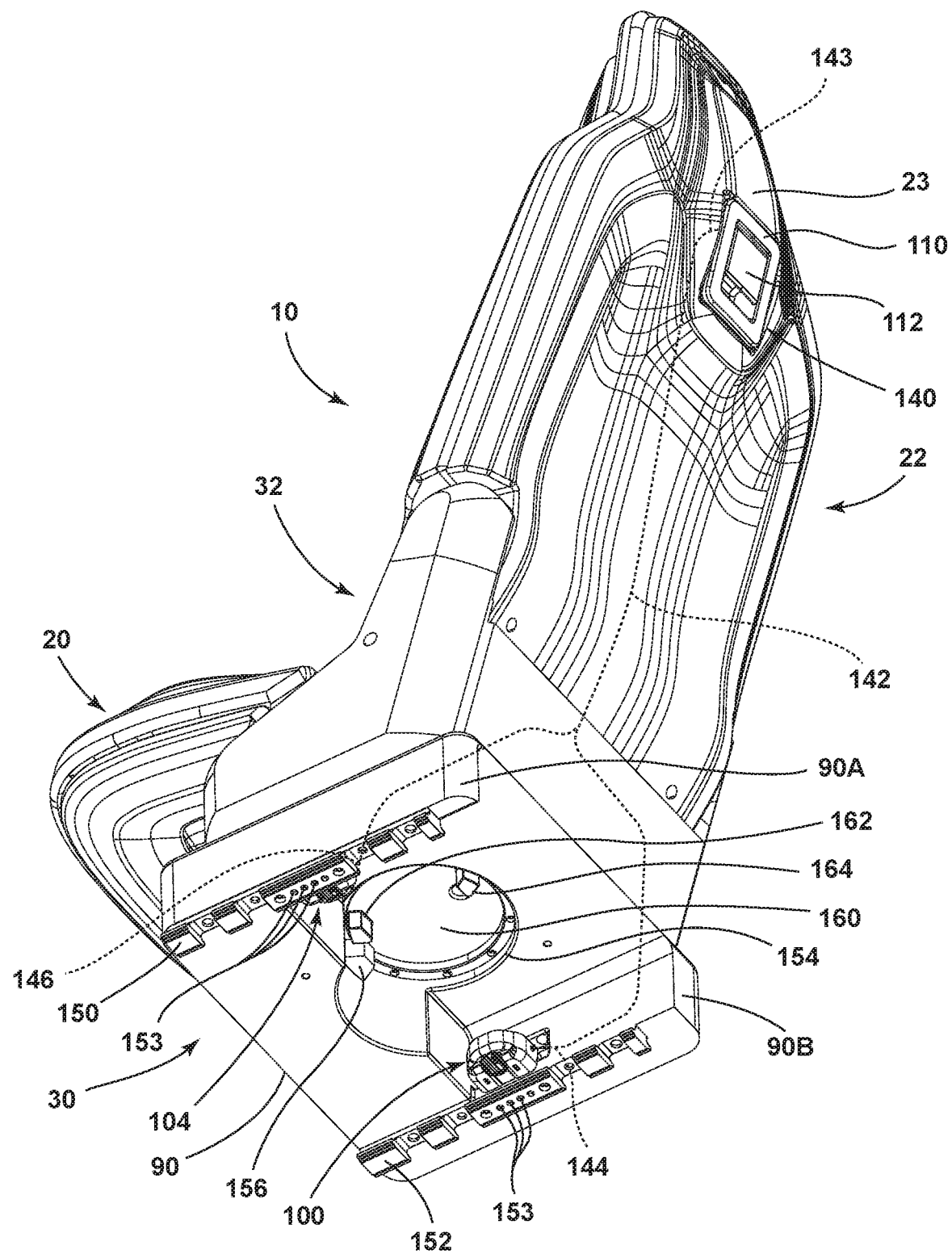
FIG. 8 is a bottom perspective view of a seat assembly.

Referring now to FIG. 8, the seat assembly 10 is shown with a release mechanism 140 disposed within the seatback 22 and accessible from a rear surface 23 of the seatback 22. The release mechanism 140 is contemplated to be of the same style as the release mechanism 50 disposed on the underside 48 of the seat portion 20. As such, the housing 110 and handle 112 of the release mechanism 50 described above also describes the housing 110 and handle 112 of the release mechanism 140. The release mechanism 140 is contemplated to be operably coupled to first and second lock mechanisms 100, 104, disposed on the base portion 90 of the swivel mechanism 30 via an attachment mechanism 142. The attachment mechanism 142 is contemplated to be a cable member having a first end 143 coupled to the handle 112 of the release mechanism 140. The attachment mechanism 142 is further contemplated to include ends 144 and 146 which are operably coupled to the first and second lock mechanisms 100, 104 such that actuation of the handle 112 of the release mechanism 140 will move the lock mechanisms 100, 104 from locked conditions to unlocked conditions. As further shown in FIG. 8, the base portion 90 of the swivel mechanism 30 includes first and second sides 90A, 90B having guide members 150, 152 which are contemplated to be received within the track members 18A, 18B, respectively, of the track assembly 18 (FIG. 3A). The guide members 150, 152 include access apertures 151, 153, respective that associated pins of the lock mechanism 100, 104 use to access locking features of the track assembly 18, as further described below. The base portion 90 of the swivel mechanism 30 further includes a generally centrally disposed aperture 154. A stop member 156 inwardly extends into the aperture 154. The bottom surface 160 of the base frame 32 includes downwardly extending engagement features 162, 164. In FIG. 8, the seat assembly 10 is shown disposed in a forward-facing configuration, wherein engagement feature 162 abuts stop member 156 of the swivel mechanism 30. When the seat assembly 10 is rotated along the pivot axis PA of the swivel mechanism 30 from the forward-facing configuration to the rearward-facing configuration, engagement feature 164 will abut stop member 165 of the swivel mechanism 30 to limit rotation of the seat assembly 10.

As further shown in FIG. 8, the first and second lock mechanisms 100, 104 are operably coupled to the release mechanism 140, such that the release mechanism 140 can control the locked and unlocked conditions of the first and second lock mechanisms 100, 104 simultaneously. As noted above, the first and second lock mechanisms 100, 104 are interconnected with the release mechanism 140 via the attachment mechanism 142. The first and second lock mechanisms 100, 104 are contemplated to be similar lock mechanisms as compared to lock mechanism 60 disposed within the base frame 32 and described above, such that like reference numerals will be used to describe like components shared between lock mechanisms 60, 100 and 104.

Figure 9:
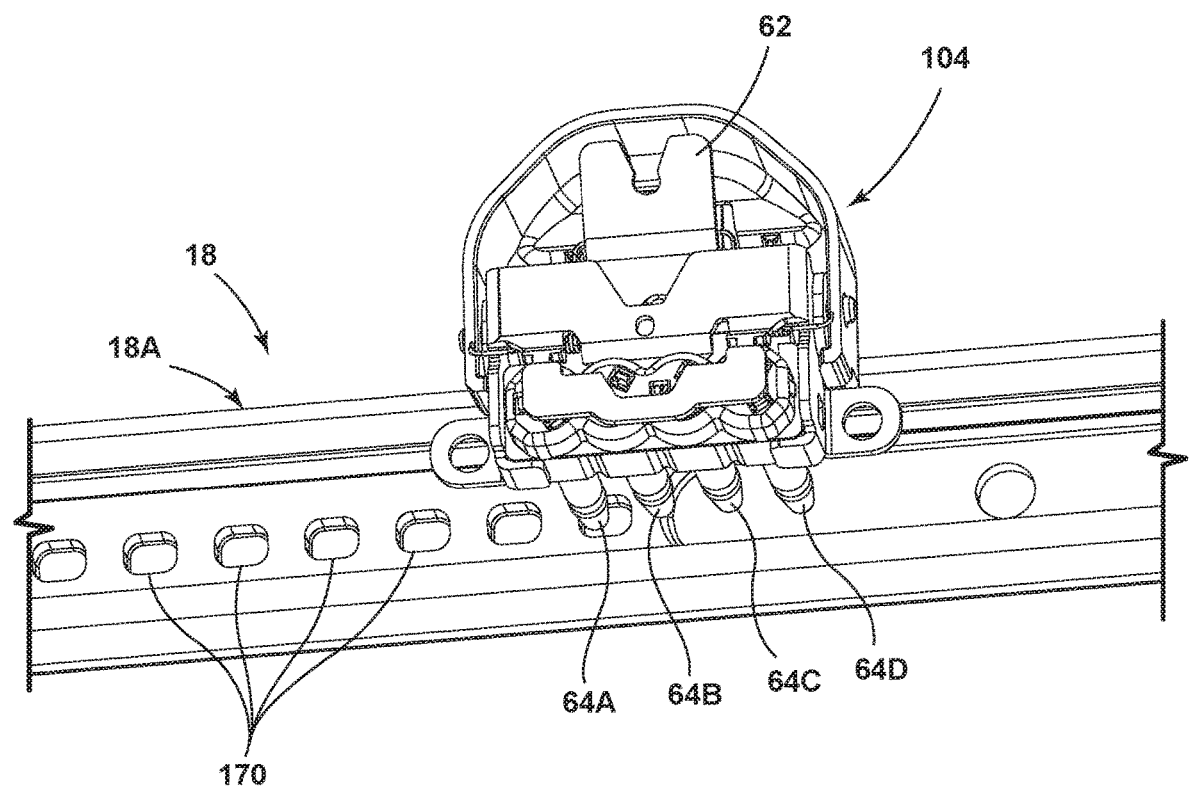
FIG. 9 is a top perspective view of a lock mechanism operably coupled to a track member.

With reference to FIG. 9, the second lock mechanism 104 includes tab 62 and pins 64A-64D. In FIG. 9, the second lock mechanism 104 is shown which is contemplated to be a reciprocal lock mechanism to the first lock mechanisms 100, such that the description of the second lock mechanism 104 also describes the first lock mechanism 100. The tab 62 of the second lock mechanism 104 shown in FIG. 9 corresponds to the second lock mechanism being in a locked condition, wherein pins 64A-64D are shown downwardly extending towards the track member 18A in deployed positions. The tab 62 of lock mechanism 104 is interconnected to the release mechanism 140 via the attachment mechanism 142 at end 146. When the attachment mechanism 142 is pulled via actuation of the handle 112 of the release mechanism 140, tab 62 of the second lock mechanism 104 will move downward to move the pins 64A-64D from the deployed positions to retracted positions. With the pins 64A-64D retracted, the second lock mechanism 104 is in the unlocked condition to allow for the seat assembly 10 to move along the track assembly 18 between fore and aft positions. Specifically, the second lock mechanism 104 moves to the unlocked condition to disengage the pins 64A-64D from the receiving apertures 170 of the track member 18A, such that the seat assembly 10 can freely move along the track assembly 18. Once the seat assembly 10 is in a desired position, a user will release the handle 112 of the release mechanism 140 to deploy the pins 64A-64D, which are biased to the deployed position, to then engage with one or more of the receiving apertures 170 of the track member 18A to retain the seat assembly 10 in a desired position along the track assembly 18. The same is true for the first lock mechanism 100 with respect to track member 18B.

As noted above, the various lock mechanisms 60, 100, 104 are contemplated to be the same style lock mechanisms having one or more deployable pins 64, 64A-64B that are operable between deployed and retracted positions. The position of the one or more deployable pins 64, 64A-64B determines a condition of the lock mechanisms 60, 100, 104 which are operable between locked and unlocked conditions. As also noted above, the lock mechanisms 60, 100, 104 are moved between locked and unlocked conditions by associated release mechanisms 50, 140. The release mechanism 50, 140 are also contemplated to be similar in structure and operation.

According to one aspect of the present invention, a seat assembly includes a base frame. A seatback is pivotally coupled to the base frame by a recliner mechanism. A seat portion is pivotally coupled to the base frame and includes a front edge. The seat portion is operable between first and second positions. The front edge of the seat portion defines a forward-most portion of the seat assembly when the seat portion is in the first position. The front edge of the seat portion is vertically juxtaposed over the base frame when the seat portion is in the second position.

an attachment mechanism having a first end operably coupled to the seat portion and a second end operably coupled to the recliner mechanism;

the seatback is biased towards an upright position, and further wherein the recliner mechanism moves from a locked condition to an unlocked condition as the seat portion moves from the first position to the second position;

a swivel mechanism, wherein the base frame is rotatably supported on the swivel mechanism, such that the seat assembly is operable between forward-facing and rearward-facing configurations;

the seat portion includes an underside having a release mechanism disposed thereon;

a lock mechanism disposed in the base frame, wherein the lock mechanism is operable between locked and unlocked conditions;

an attachment mechanism having first and second ends, wherein the first end of the attachment mechanism is operably coupled to the release mechanism, and further wherein the second end of the attachment mechanism is operably coupled to the lock mechanism;

the release mechanism includes a handle operable between first and second positions, and further wherein the lock mechanism moves from the locked condition to the unlocked condition when the handle moves from the first position to the second position via the attachment mechanism;

the swivel mechanism includes first and second receiving apertures associated with the forward-facing and rearward-facing configurations of the seat assembly, respectively;

the lock mechanism includes a pin operable between deployed and retracted positions, and further wherein the pin is received in one of the first receiving aperture and the second receiving aperture when the pin is in the deployed position to retain the seat assembly in one of the forward-facing configuration and the rearward-facing configuration; and the seat portion defines a first rotational footprint of the seat assembly when the seat portion is in the first position, and further wherein the seat assembly includes a second rotational footprint that is less than the first rotational footprint when the seat portion is in the second position.

According to another aspect of the present invention, a seat assembly includes a base frame including a support surface and first and second support brackets upwardly extending from opposed sides of the support surface. A seat portion is pivotally coupled to the first and second support brackets between use and upright non-use positions. A front edge of the seat portion is vertically juxtaposed over the base frame when the seat portion is in the upright non-use position.
- at least one abutment member upwardly extending from the support surface of the base frame and having a rear surface;
- at least one abutment member outwardly extending from a rear portion of the seat portion and having a front surface, wherein the front surface of the at least one abutment member of the seat portion abuts the rear surface of the at least one abutment member of the base frame when the seat portion is in the upright non-use position;
- a magnetic member disposed within the at least one abutment member of the seat portion; and
- a reciprocal magnetic member disposed within the at least one abutment member of the base frame, wherein the magnetic member and the reciprocal magnetic member are magnetically coupled to one another when the seat portion is in the upright non-use position.

According to yet another aspect of the present invention, seat assembly includes a track assembly. A swivel mechanism is slideably supported along the track assembly. A base frame supported on the swivel mechanism between forward-facing and rearward-facing configurations. A seatback is pivotally coupled to the base frame by a recliner mechanism. A seat portion is pivotally coupled to the base frame and includes a front edge. The seat portion is operable between first and second positions. The front edge of the seat portion defines a forward-most portion of the seat assembly when the seat portion is in the first position. The front edge of the seat portion is vertically juxtaposed over the base frame when the seat portion is in the second position.
- an attachment mechanism having a first end operably coupled to a rear portion of the seat portion and a second end operably coupled to the recliner mechanism, wherein the recliner mechanism moves from a locked condition to an unlocked condition via the attachment mechanism as the seat portion moves from the first position to the second position;
- a release mechanism disposed on a rear surface of the seatback, wherein the release mechanism includes a handle operable between first and second positions;
- lock mechanism operably coupled between the track assembly and the swivel mechanism, wherein the lock mechanism is operable between locked and unlocked conditions relative to the track assembly;
- an attachment mechanism having a first end operably coupled to the release mechanism, and a second end operably coupled to the lock mechanism, wherein the lock mechanism moves from the locked condition to the unlocked condition when the handle moves from the first position to the second position; and
- the lock mechanism includes one or more pins operable between deployed and retracted positions, and further wherein the one or more pins are engaged with the track assembly in the deployed position and disengaged from the track assembly in the retracted position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
   - a base frame having a support surface and first and second support brackets upwardly extending from opposed sides of the support surface;
   - a seat portion pivotally coupled to the first and second support brackets between use and upright non-use positions, wherein a front edge of the seat portion is vertically juxtaposed over the base frame when the seat portion is in the upright non-use position;
   - at least one abutment member upwardly extending from the support surface of the base frame and having a rear surface;
   - at least one abutment member outwardly extending from a rear portion of the seat portion and having a front surface, wherein the front surface of the at least one abutment member of the seat portion abuts the rear surface of the at least one abutment member of the base frame when the seat portion is in the upright non-use position;
   - a magnetic member disposed within the at least one abutment member of the seat portion; and
   - a reciprocal magnetic member disposed within the at least one abutment member of the base frame, wherein the magnetic member and the reciprocal magnetic member are magnetically coupled to one another when the seat portion is in the upright non-use position.

2. The seat assembly of claim 1, including:
   - a swivel mechanism, wherein the base frame is rotatably supported on the swivel mechanism, such that the seat assembly is operable between forward-facing and rearward-facing configurations.

3. The seat assembly of claim 2, wherein the seat portion includes an underside having a release mechanism disposed thereon.

4. The seat assembly of claim 3, including:
   - a lock mechanism disposed in the base frame, wherein the lock mechanism is operable between locked and unlocked conditions.

5. The seat assembly of claim 4, including:
   - a second attachment mechanism having first and second ends, wherein the first end of the second attachment mechanism is operably coupled to the release mechanism, and further wherein the second end of the second attachment mechanism is operably coupled to the lock mechanism.

6. The seat assembly of claim 5, wherein the release mechanism includes a handle operable between first and second positions, and further wherein the lock mechanism moves from the locked condition to the unlocked condition when the handle moves from the first position to the second position via the attachment mechanism.

7. The seat assembly of claim 6, wherein the swivel mechanism includes first and second receiving apertures associated with the forward-facing and rearward-facing configurations of the seat assembly, respectively.

8. The seat assembly of claim 7, wherein the lock mechanism includes a pin operable between deployed and retracted positions, and further wherein the pin is received in one of the first receiving aperture and the second receiving aperture when the pin is in the deployed position to retain the seat assembly in one of the forward-facing configuration and the rearward-facing configuration.

9. The seat assembly of claim 2, wherein the seat portion defines a first rotational footprint of the seat assembly when the seat portion is in the first position, and further wherein the seat assembly includes a second rotational footprint that is less than the first rotational footprint when the seat portion is in the second position.

10. A seat assembly, comprising:
a track assembly;
a swivel mechanism slideably supported along the track assembly;
a base frame supported on the swivel mechanism between forward-facing and rearward-facing configurations, wherein the base member includes a magnetic member;
a seatback pivotally coupled to the base frame by a recliner mechanism; and
a seat portion pivotally coupled to the base frame and having a front edge, wherein the seat portion is operable between first and second positions, and further wherein the front edge of the seat portion defines a forward-most portion of the seat assembly when the seat portion is in the first position, and further wherein the front edge of the seat portion is vertically juxtaposed over the base frame when the seat portion is in the second position, wherein the seat portion further includes a reciprocal magnetic member, and further wherein the magnetic member of the base frame and the reciprocal magnetic member of the seat portion are magnetically coupled to one another when the seat portion is in the second position.

11. The seat assembly of claim 10, including:
an attachment mechanism having a first end operably coupled to a rear portion of the seat portion and a second end operably coupled to the recliner mechanism, wherein the recliner mechanism moves from a locked condition to an unlocked condition via the attachment mechanism as the seat portion moves from the first position to the second position.

12. The seat assembly of claim 10, including:
a release mechanism disposed on a rear surface of the seatback, wherein the release mechanism includes a handle operable between first and second positions; and
a lock mechanism operably coupled between the track assembly and the swivel mechanism, wherein the lock mechanism is operable between locked and unlocked conditions relative to the track assembly.

13. The seat assembly of claim 12, including:
an attachment mechanism having a first end operably coupled to the release mechanism, and a second end operably coupled to the lock mechanism, wherein the lock mechanism moves from the locked condition to the unlocked condition when the handle moves from the first position to the second position.

14. The seat assembly of claim 13, wherein the lock mechanism includes one or more pins operable between deployed and retracted positions, and further wherein the one or more pins are engaged with the track assembly in the deployed position and disengaged from the track assembly in the retracted position.

* * * * *